United States Patent [19]
Ohtani

[11] Patent Number: 5,598,271
[45] Date of Patent: Jan. 28, 1997

[54] CONTROL METHOD FOR A DIGITAL COPIER IN A TWO-SIDED DOCUMENT COPY MODE WITH INTERRUPTS

[75] Inventor: Masayuki Ohtani, Yokohama, Japan

[73] Assignee: Ricoh Company, Ltd., Tokyo, Japan

[21] Appl. No.: 296,248

[22] Filed: Aug. 25, 1994

[30] Foreign Application Priority Data

Aug. 30, 1993 [JP] Japan .................................. 5-214400

[51] Int. Cl.$^6$ .............................. H04N 1/21; G03G 21/00
[52] U.S. Cl. ...................... 358/296; 358/401; 395/115; 399/374
[58] Field of Search ....................... 358/296, 401, 358/444, 468, 496, 494, 497; 355/313, 314; 395/115, 734–42, 867, 868

[56] References Cited

U.S. PATENT DOCUMENTS

| | | | |
|---|---|---|---|
| 5,206,735 | 4/1993 | Gauronski et al. | 358/296 |
| 5,438,435 | 5/1995 | Lawniczak | 358/496 |

FOREIGN PATENT DOCUMENTS

| | | |
|---|---|---|
| 2756761 | 6/1978 | Germany . |
| 2810435 | 9/1978 | Germany . |
| 3225209 | 1/1983 | Germany . |
| 3607066 | 9/1986 | Germany . |
| 3708317 | 6/1988 | Germany . |

Primary Examiner—Peter S. Wong
Assistant Examiner—Gregory J. Toatley, Jr.
Attorney, Agent, or Firm—Oblon, Spivak, McClelland, Maier & Neustadt, P.C.

[57] ABSTRACT

In a digital copier operable in a two-sided copy document mode using an automatic document feeder (ADF), when the two-sided document copy mode is selected, a second side of a two-sided document is read, and the resulting image data are written to storing means which can accommodate image data representative of two documents. Subsequently, a first side of the document is read and stored while, at the same time, the image data representative of the second side are read out and printed by the printer. Then, image data representative of the first side are read out and printed out. Hence, the document can be replaced before the preceding side is fully copied. This eliminates the extra period of time otherwise consumed by the replacement of documents. As a result, the occupancy time of the copy is reduced as a whole, promoting the efficient operation of the copier. Furthermore, one of two different kinds of interrupting means is freely selectable, so that the scanner and printer can be used independently of each other on the basis of the kind of interruption. Hence, even when a two-sided document copy mode using an ADF should be interrupted, image data representative of the second and first sides of a two-sided document can be continuously printed out since they are stored in the storing means. This also reduces the overall time loss of the digital copier.

10 Claims, 32 Drawing Sheets

Fig. 8A
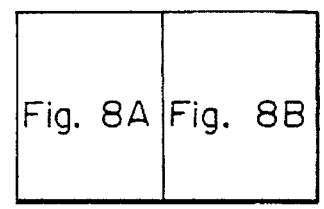
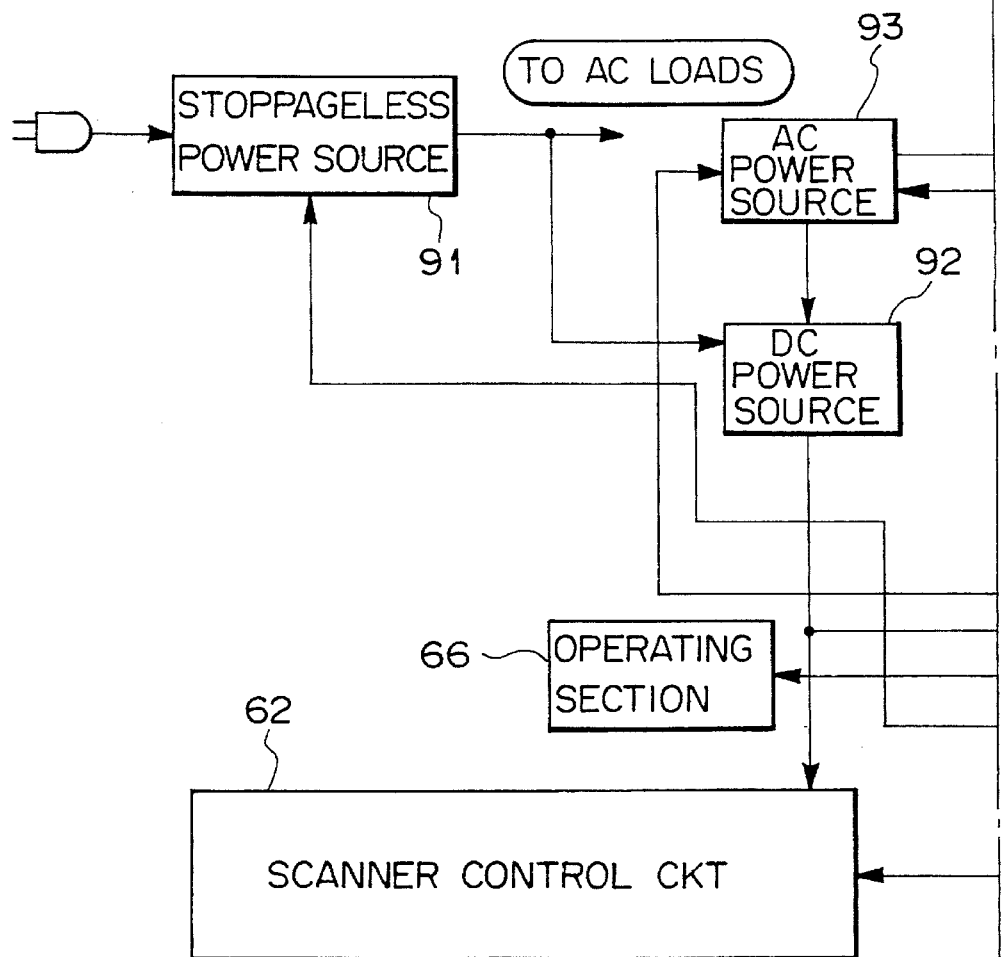

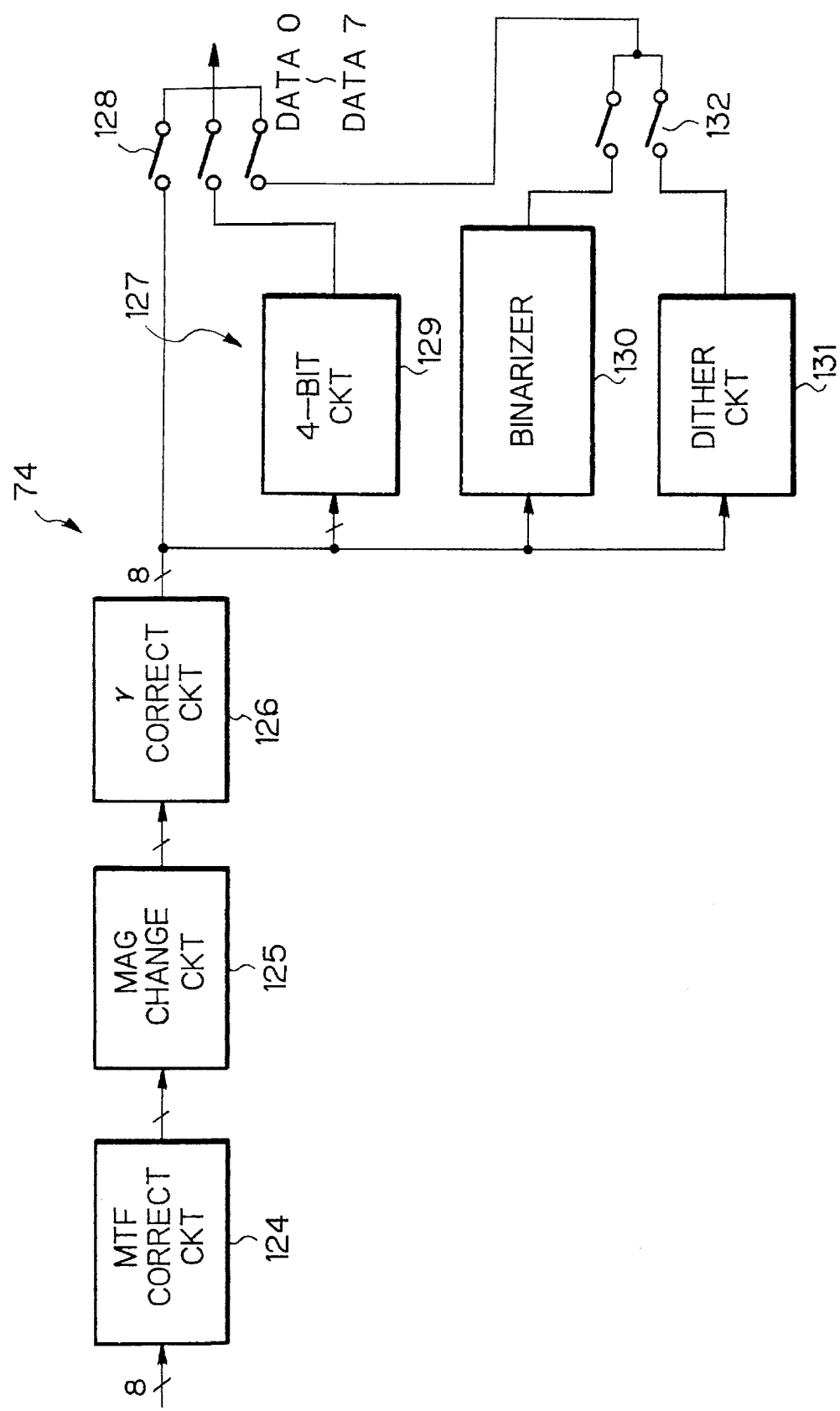

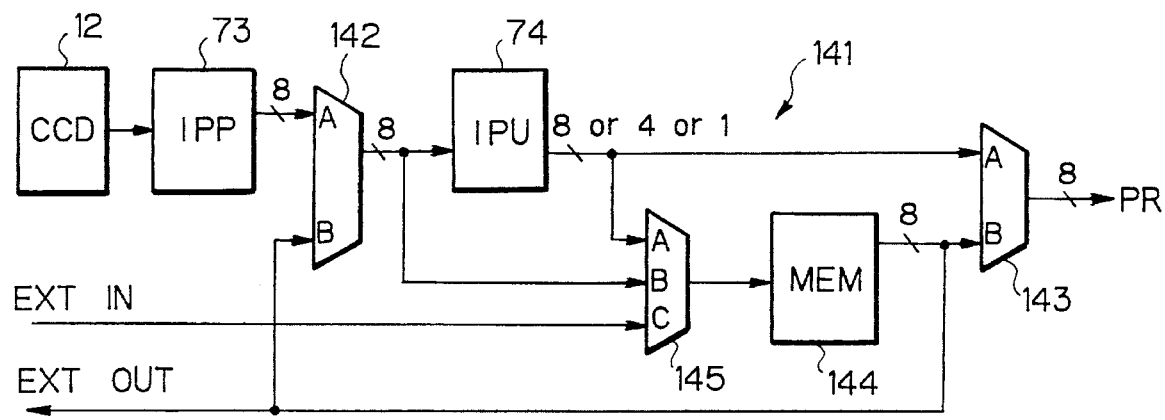

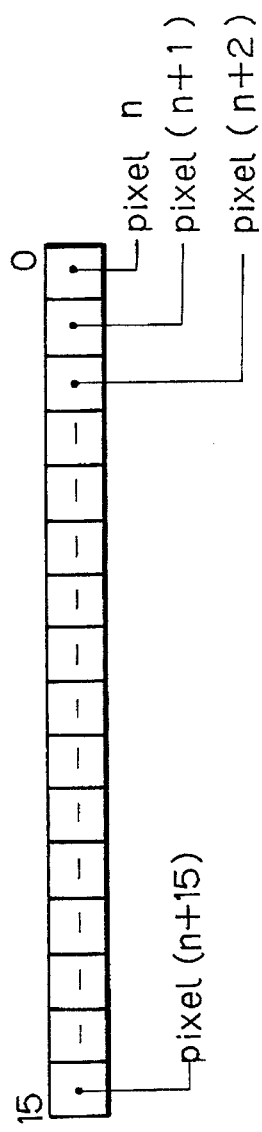
Fig. 20A  TYPE 1
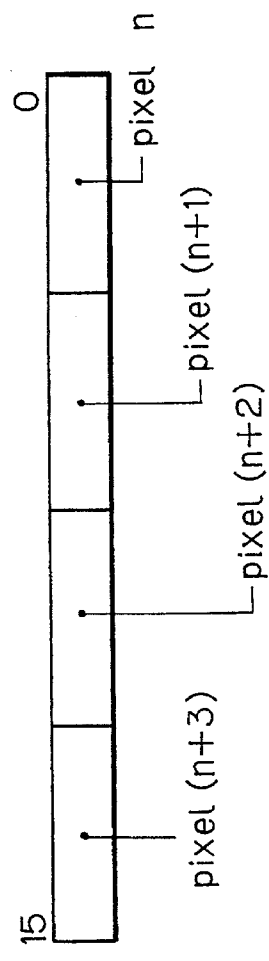
Fig. 20B  TYPE 2
Fig. 20C  TYPE 3

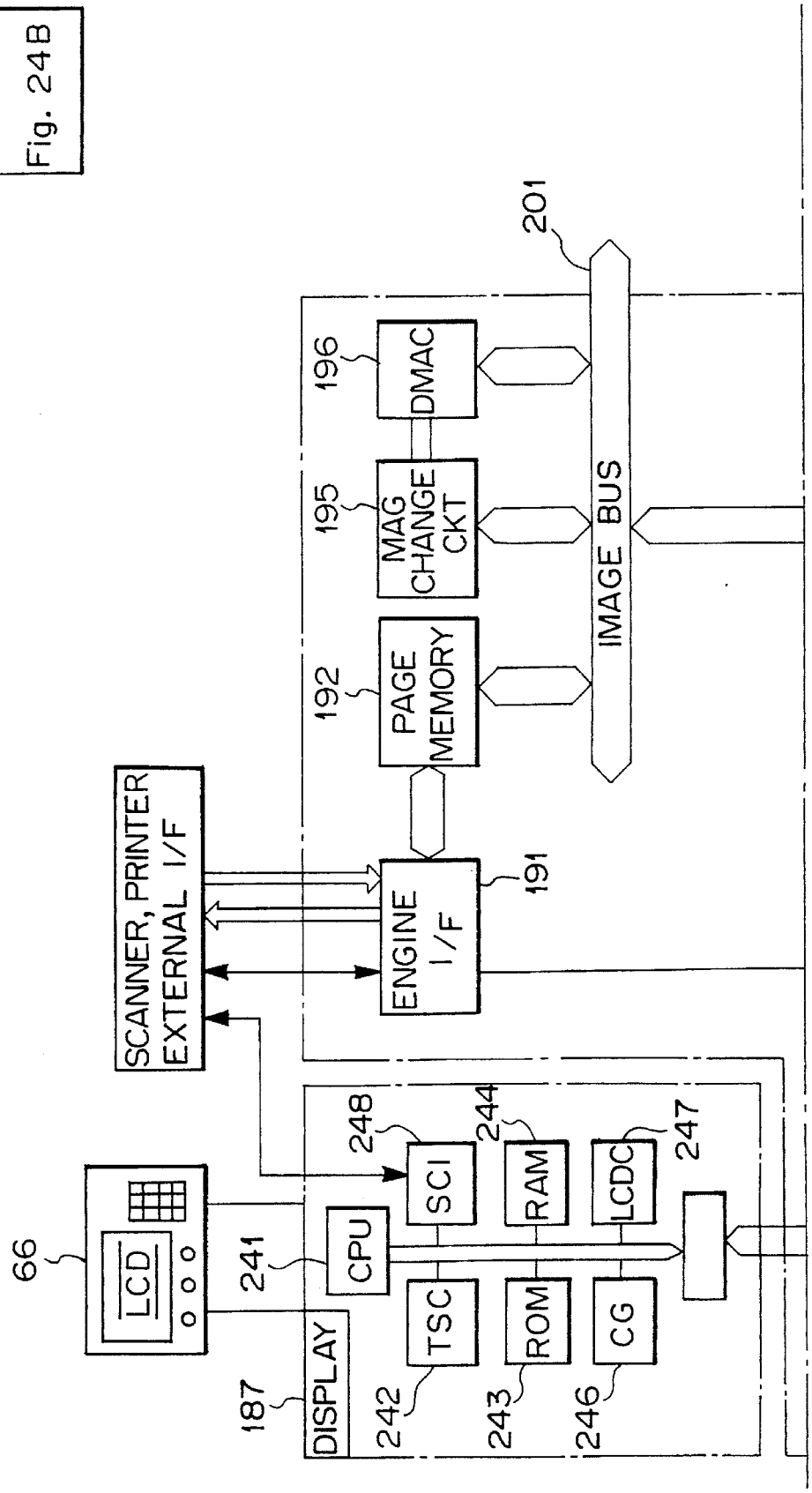

1

CONTROL METHOD FOR A DIGITAL COPIER IN A TWO-SIDED DOCUMENT COPY MODE WITH INTERRUPTS

BACKGROUND OF THE INVENTION

The present invention relates to a control method for a digital copier which is operable in a two-sided document copy mode using an automatic document feeder (ADF).

It is a common practice with a digital copier of the type described to effect a two-sided document copy mode by feeding a two-sided document while turning it over so as to read a second side (rear) of the document by a scanner, copying it a desired number of times, turning over the document by an ADF, reading a first side (front) of the document by a scanner, copying the first side the desired number of times, replacing the document with another two-sided document, and then repeating the above procedure with the new document. The problem with such a procedure is that in the two-sided document copy mode, the ADF has to turn over each document in the event of replacement, resulting in a lower continuous coping speed than in a one-sided document copy mode. Consequently, the operation efficiency of the entire copier is limited. In this respect, there has been proposed to read a document image by a scanner, write the resulting image data in a memory, and print out the image data repeatedly (so-called memory retention). This kind of scheme reduces the wasteful interval between the end of document reading and the beginning of the next document reading (e.g. a time necessary for the scanner to return), thereby reducing a repeat copying time. However, such an approach cannot deal with a two-sided document copy mode. Moreover, an interrupt function available with the conventional digital copier is not satisfactory since even when a person desires to use only the scanner, the entire copying operation has to be interrupted. This is troublesome in various aspects, e.g., the continuation of the remaining copying operation and the resetting of documents.

SUMMARY OF THE INVENTION

It is, therefore, an object of the present invention to provide a control method which allows a digital copier to operate in a two-sided document copy mode using an ADF without wasting time and, therefore, with improved productivity.

In accordance with the present invention, in a digital copier operable in a two-sided document copy mode and having a scanner for reading a document image, a printer for printing out image data generated by the scanner on a sheet, an ADF for transporting a document to be read by the scanner and having a document turning function, a storage capable of storing image data representative of at least two documents, and a controller, a control method comprises the steps of causing, when the two-sided document copy mode is selected, the scanner to read a second side of a two-sided document before copying a first side of the document, storing image data representative of the second side in the storage, causing the ADF to turn over the document, causing the scanner to read the first side of the document turned over, storing image data representative of the first side in the storage and, at the same time, sequentially reading the image data representative of the first and second sides out of the storage, and causing the printer to print out the image data representative of the first and second sides.

Also, in accordance with the present invention, in a digital copier operable in a two-sided document copy mode and having a scanner for reading a document image, a printer for printing out image data generated by the scanner on a sheet, an ADF for transporting a document to be read by the scanner and having a document turning function and a sheet through function, a storage capable of storing image data representative of at least two documents, and a controller, a control method comprises the steps of causing, when the two-sided document copy mode is selected, the scanner to read a second side of a two-sided document while the ADF is turning over and feeding the document, storing image data representative of the second side in the storage, causing the scanner to read the first side of the document turned over, storing image data representative of the first side in the storage and, at the same time, sequentially reading the image data representative of the first and second sides out of the storage, and causing the printer to print out the image data representative of the first and second sides.

Further, in accordance with the present invention, a digital copier operable in a two-sided document copy mode comprises a scanner for reading a document image, a printer for printing out image data generated by the scanner on a sheet, an ADF for transporting a document to be read by the scanner and having a document turning function, a storage capable of storing image data representative of at least two documents, and a controller for controlling the scanner, printer, ADF and storage such that when the two-sided document copy mode is selected, the scanner reads a second side of the document before copying a first side, image data representative of the second side are written to the storage, the scanner reads the first side after the ADF has turned over the document, and then image data representative of the first side are written to the storage and, at the same time, the image data representative of the first and second sides are sequentially read out and printed out by the printer.

Moreover, in accordance with the present invention, a digital copier operable in a two-sided document copy mode comprises a scanner for reading a document image, a printer for printing out image data generated by the scanner on a sheet, an ADF for transporting a document to be read by the scanner and having a document turning function and a sheet through function, a storage capable of storing image data representative of at least two documents, and a controller for controlling the scanner, printer, ADF and storage such that when the two-sided document copy mode is selected, the scanner reads a second side of the document while the ADF is turning over and feeding the document, image data representative of the second side are written to the storage, the scanner reads a first side of the document turned over, and image data representative of the first side are written to the storage and, at the same time, the image data representative of the first and second sides are sequentially read out of the storage and printed out by the printer.

BRIEF DESCRIPTION OF THE DRAWINGS

The above and other objects, features and advantages of the present invention will become more apparent from the following detailed description taken with the accompanying drawings in which:

FIG. 13 is a block diagram schematically showing an image processing unit also associated with the scanner;

FIGS. 14A–14C show different types of data output from the image processing unit;

FIG. 15 is a schematic block diagram of a memory system in accordance with the present invention;

FIGS. 20A–20C show different types of data;

DESCRIPTION OF THE PREFERRED EMBODIMENTS

Figure 5:
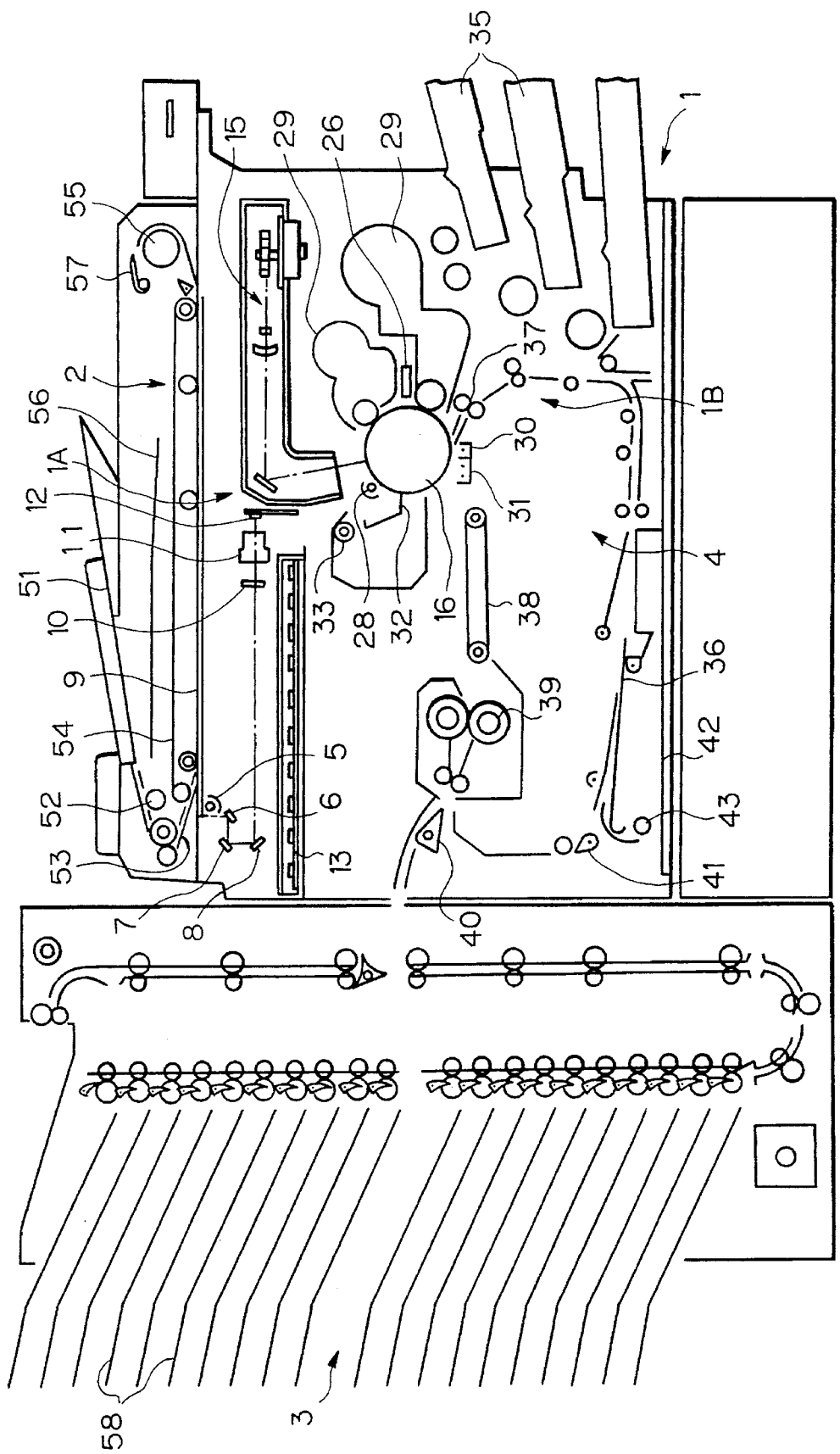
FIG. 5 is a section showing the general construction of a digital copier to which the present invention is applicable.

Referring to FIG. 5 of the drawings, a dual digital copier having a copying function and a facsimile function and to which the present invention is applicable is shown. As shown, the copier is generally made up of a copier body 1, an automatic document feeder (ADF) 2, a sorter unit 3 with a stapler, a turn-over unit 4. The units 2, 3 and 4 are mounted on the copier body 1.

The copier body 1 has a scanner 1A and a printer 1B. The printer 1B includes an optical writing section, a photoconductive element section, a developing section, and a sheet feed section. The scanner 1A has a first carriage and a second carriage, not shown. The first carriage is loaded with a light source 5 having a reflector, and a first mirror 6 and is movable at a constant speed. The second carriage is loaded with a second and a third mirror 7 and 8 and movable in association with and at half the speed of the first carriage. As the first and second carriages optically scan a document laid on a glass platen 9, the resulting reflection from the document is incident to a monodimensional solid-state imaging device 12 via a color filter 10 and a lens 11. While the light source 5 may be implemented by either a fluorescent lamp or a halogen lamp, use is often made of a fluorescent lamp due to stable wavelength and long life particular thereto. The imaging device 12 is generally implemented by a CCD (Charge Coupled Device) image sensor. The output of the imaging device 12, i.e., an analog image signal is transformed to digital data and then subjected to various kinds of image processing (e.g. conversion to two levels or multiple levels, tone processing, magnification change, and editing). As a result, a digital signal which is an aggregation of spots is generated from the image data.

To produce color image data, the color filter 10 is movable into and out of the optical path extending from the document to the imaging device 12, thereby transmitting only the data of necessary color. This, coupled with a multiplex image transfer mode or a duplex copy mode, allows various kinds of copies to be produced, as desired.

Figure 6:
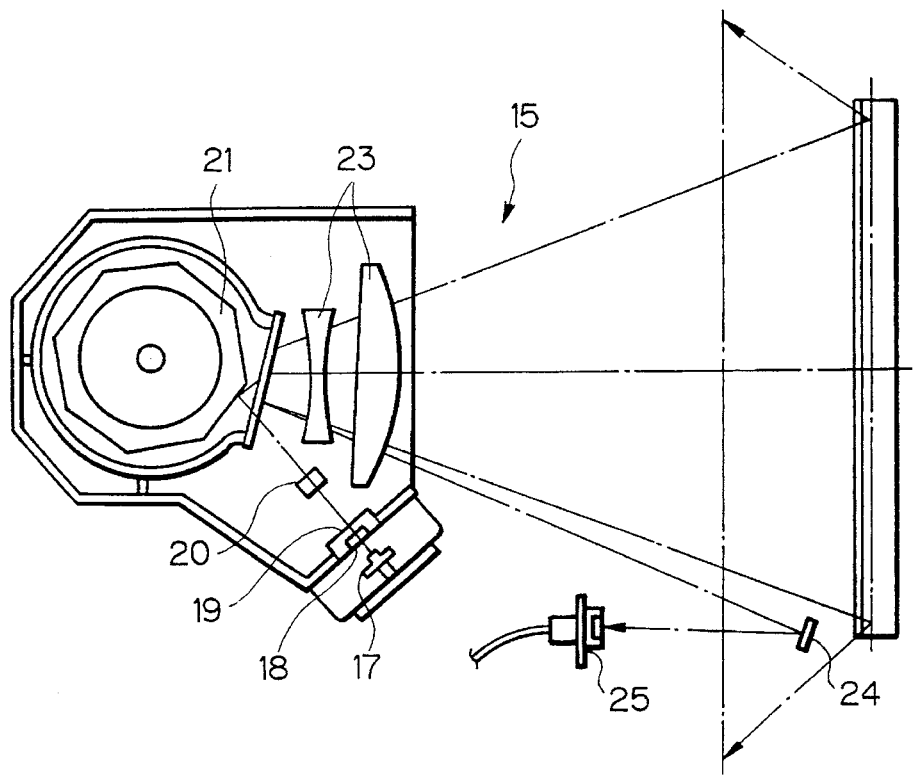
FIG. 6 is a plan view of an optical writing system included in the copier.
Figure 7:
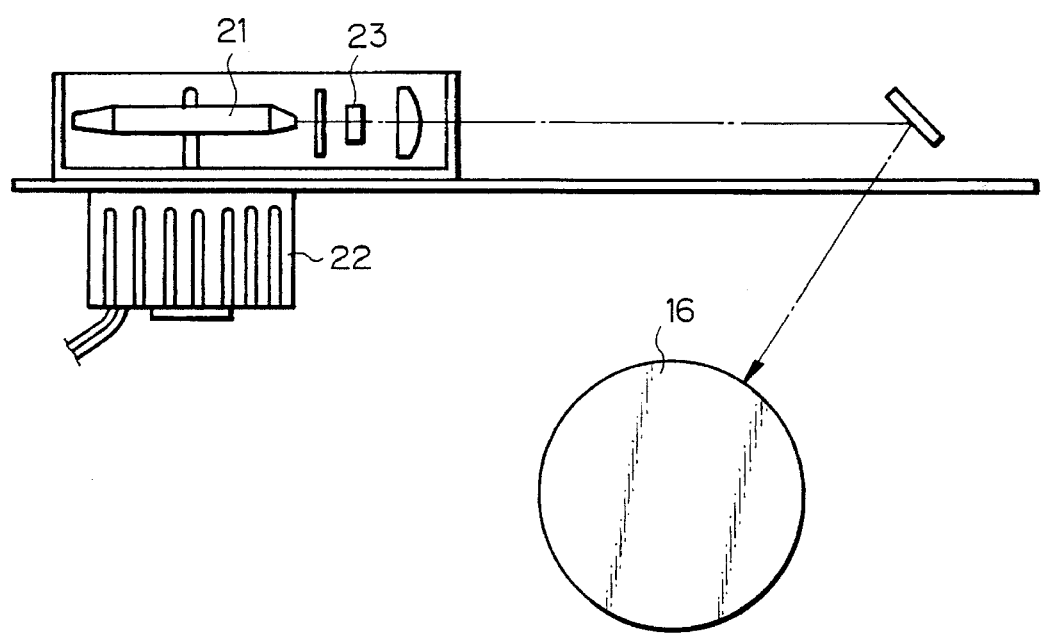
FIG. 7 is a front view of the optical writing system.

The optical writing section, included in the printer 1B and designated by the reference numeral 15, writes the processed image data on a photoconductive element 16 in the form of an aggregation of spots by raster-scanning it with a laser beam. The photoconductive element 16 is implemented as a drum by way of example. The writing section 15 is shown in a plan view and a front view in FIGS. 6 and 7, respectively. A laser beam from a semiconductor laser 17 is collimated by a collimator lens 18 and then shaped by an aperture 19 to turn out a beam having a predetermined configuration. The beam from the aperture 19 is compressed by a first cylinder lens 20 in the subscanning direction and then incident to a polygon mirror 21. The polygon mirror 21 is provided with an accurate polygonal configuration and rotated by a polygon motor 22 in a predetermined direction at a predetermined speed. As a result, the laser beam incident to the polygon mirror 21 is steered by the mirror 21 to reach an f-θ lens 23. This lens 23 causes the laser beam, having a constant angular speed, to scan the drum 16 at the same speed; the beam is focused onto the drum 16 to form a spot of minimum diameter. At the same time, at a position outside of the image region, the laser beam transmitted through the f-θ lens 23 is steered by a mirror 24 onto an input section 25 for synchronization. An optical fiber transfers the laser beam incident to the input section 25 to a sensor. This part of the laser beam is used to detect synchronization in the main scanning direction. Specifically, on the elapse of a predetermined period of time after the appearance of a synchronizing signal, one line of image data is output. This is repeated line by line to write image data on the drum 16 bidimensionally.

In the illustrative embodiment, the printer 1B further includes an LED (Light Emitting Diode) array, or second optical writing section, 26. The LED array 26 has LEDs arranged at a pitch of 400 dots per inch (dpi). The LEDs are individually turned on and turned off to form a latent image on the drum 16.

The drum 16 has a photoconductive surface layer which is sensitive to a semiconductor laser beam having a wavelength of 780 nm. Such a photoconductive layer may be implemented by an organic photoconductor (OPC), α-Si or Se-Te by way of example (OPC in the embodiment). Generally, laser beam writing is effected by either a negative-to-positive (N/P) process which illuminates an image portion or a positive-to-positive (P/P) process which illuminates a background. The embodiment uses the N/P process. A main charger 28 may be implemented by a scorotron charger and uniformly charges the surfaces of the drum 16. When the laser beam scans the image forming portion of the drum 16, the charge deposited by the main charger 28 falls there. As a result, the charge on the drum 16 changes to −750 V to −800 V in the background and to −500 V in the image portion, forming an electrostatic latent image on the drum 16. A developing unit 29 has a developing roller to which a bias voltage of −500 V to −600 V is applied. The developing unit 29 deposits a negatively charged toner on the latent image to thereby produce a corresponding toner image. When a sheet is fed from the previously mentioned sheet feed section in synchronism with the rotation of the drum 16, a transfer charger 30 transfers the toner image from the drum 16 to the sheet by applying a positive charge. After the image transfer, a separation charger 31 separates the sheet from the drum 16 by AC discharging. Thereafter, a cleaning unit 32 removes the toner remaining on the drum 16, and a discharge lamp 33 illuminates the cleaned surface of the drum 16 in order to dissipate the remaining charge.

The sheet feed section has a plurality of sheet cassettes 35 positioned one above the other, and a refeed loop 36. A sheet carrying an image on one side thereof may be passed through the refeed loop 36 to be provided with an image on the other side thereof or to be fed again. When the operator of the copier selects one of the sheet cassettes 35 and then presses a start button, a pick-up roller adjoining the cassette 35 is rotated. The pick-up roller drives a sheet out of the cassette 35 until the leading edge of the sheet abuts against a registration roller pair 37, which is in a halt then. The registration roller pair 37 starts rotating in synchronism with the toner image on the drum 16, thereby feeding the sheet toward the drum 16. This is followed by the image transfer and sheet separation stated earlier. The sheet separated from the drum 16 is conveyed to a fixing unit 39 by a conveyor 38 using suction. After the fixing unit 39 has fixed the toner image on the sheet by heat, the sheet is, in an ordinary copy mode, steered by a path selector, or pawl, 40 toward an outlet adjoining the sorter unit 3. On the other hand, in a multiplex copy mode, the path selector 40 blocks the path extending toward the sorter unit 3, so that the sheet is again guided toward the registration roller pair 37 via the refeed loop 36. A duplex copy mode may be implemented by the copier body 1 only or by the turn-over unit 4. Assuming the former scheme, the sheet steered downward by the path selector 40 is again steered by a path selector 41 toward a tray 42 which is disposed below the refeed loop 36. The sheet is again fed out from the roller 43 into the refeed loop 36 by a roller 43 while being turned over; the loop 36 guides it toward the registration roller pair 37.

The ADF 2 automatically feeds a stack of documents onto the glass platen 9 one by one while driving them out after reproduction. In the illustrative embodiment, the ADF 2 is provided with a document turning function so as to deal with two-sided documents in addition to one-sided documents. Specifically, documents tacked on a tray 51 are fed, one at a time, from the tray 51 by a pick-up roller 52. In a one-sided document mode, the document being moved along a guide 53 is brought to a predetermined position on the glass platen 9 by a conveyor belt 54. The document is set at the particular position on the glass platen 9 and then illuminated by the scanner 1A. After the document has been reproduced (illuminated) a desired number of times, it is again conveyed by the belt 54 and driven out to a discharge tray 56 via a turn/discharge section 55. On the other hand, in a two-sided document mode, a two-sided document is brought to the turn/discharge section 55 by the belt 54, turned over by a pawl 57 and then moved to the preselected position on the glass platen 9 from the right to the left, as viewed in FIG. 5. In this position, a second side (rear) of the document is scanned by the scanner 1A. After the illumination of the second side of the document, the conveyor belt 54 and turn/discharge section 55 are again driven to again turn over the document and set it on the glass platen 9. In this position, a first side (front) of the document is scanned by the scanner 1A. Thereafter, the two-sided document is driven out to the discharge tray 56 via the turn/discharge section 55 while, at the same time, the next two-sided document begins to be fed from the tray 51.

Even a sheet-through type ADF is provided with a document turning function. In this case, however, a document is read by a scanner while being transported from a document table, i.e., during transport. Hence, the scanner starting step is not necessary.

The sorter unit 3 selectively discharges sheets sequentially coming out of the copier body 1 in order of page, page by page, or to predetermined bins 58 thereof.

Figure 8B:
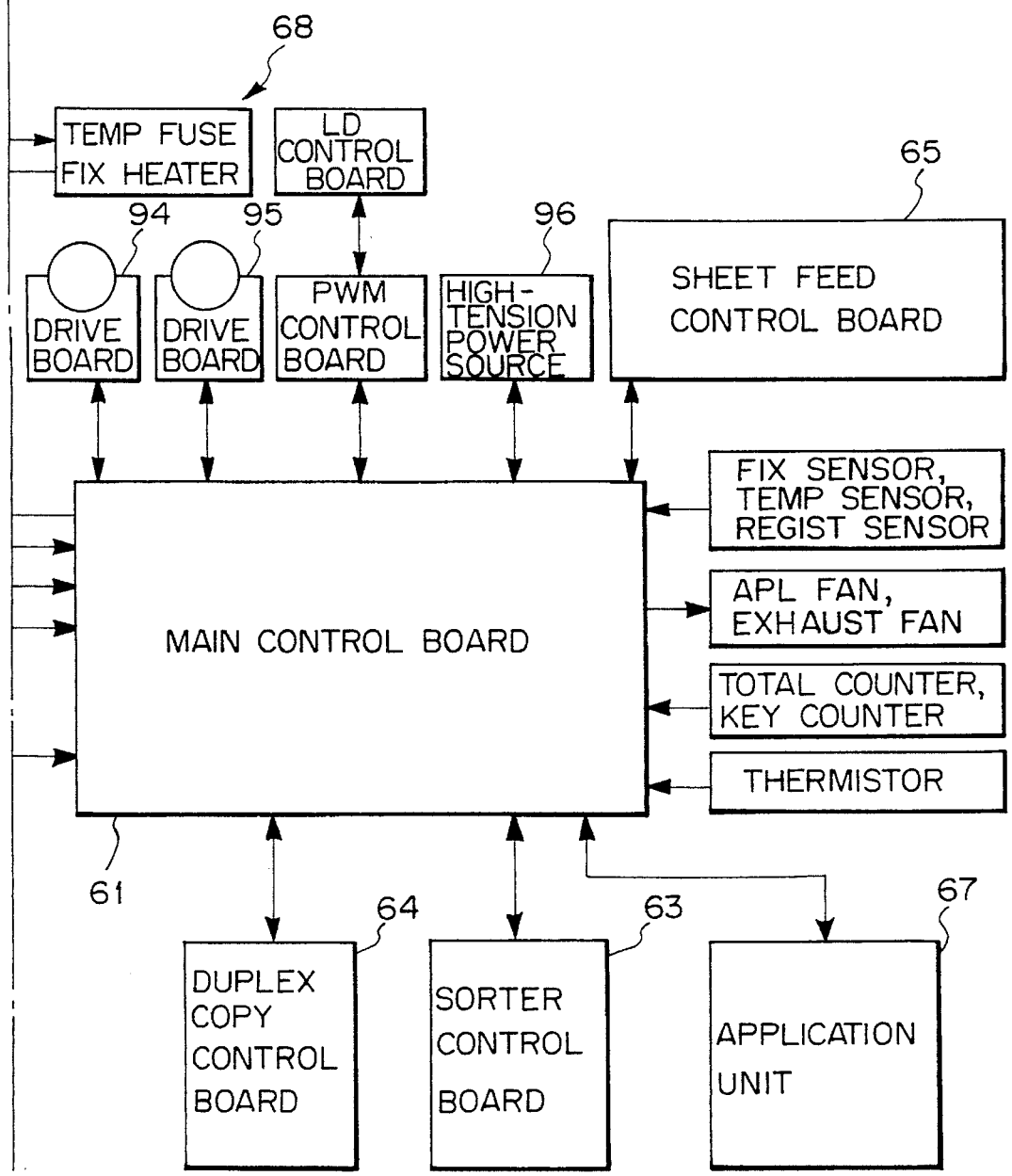
FIG. 8 is a block diagram schematically showing a control system included in the copier.

Referring to FIG. 8, the general construction of a control system included in the embodiment will be described. As shown, a main control board 61 controls a scanner control circuit 62, a sorter control board 63, a duplex copy control board 64 and a sheet feed control board 65 as well as an operating section 66 and an application unit 67. The main control board 61 is connected to a commercially available power source by a power source circuit, generally 68.

Figure 9:
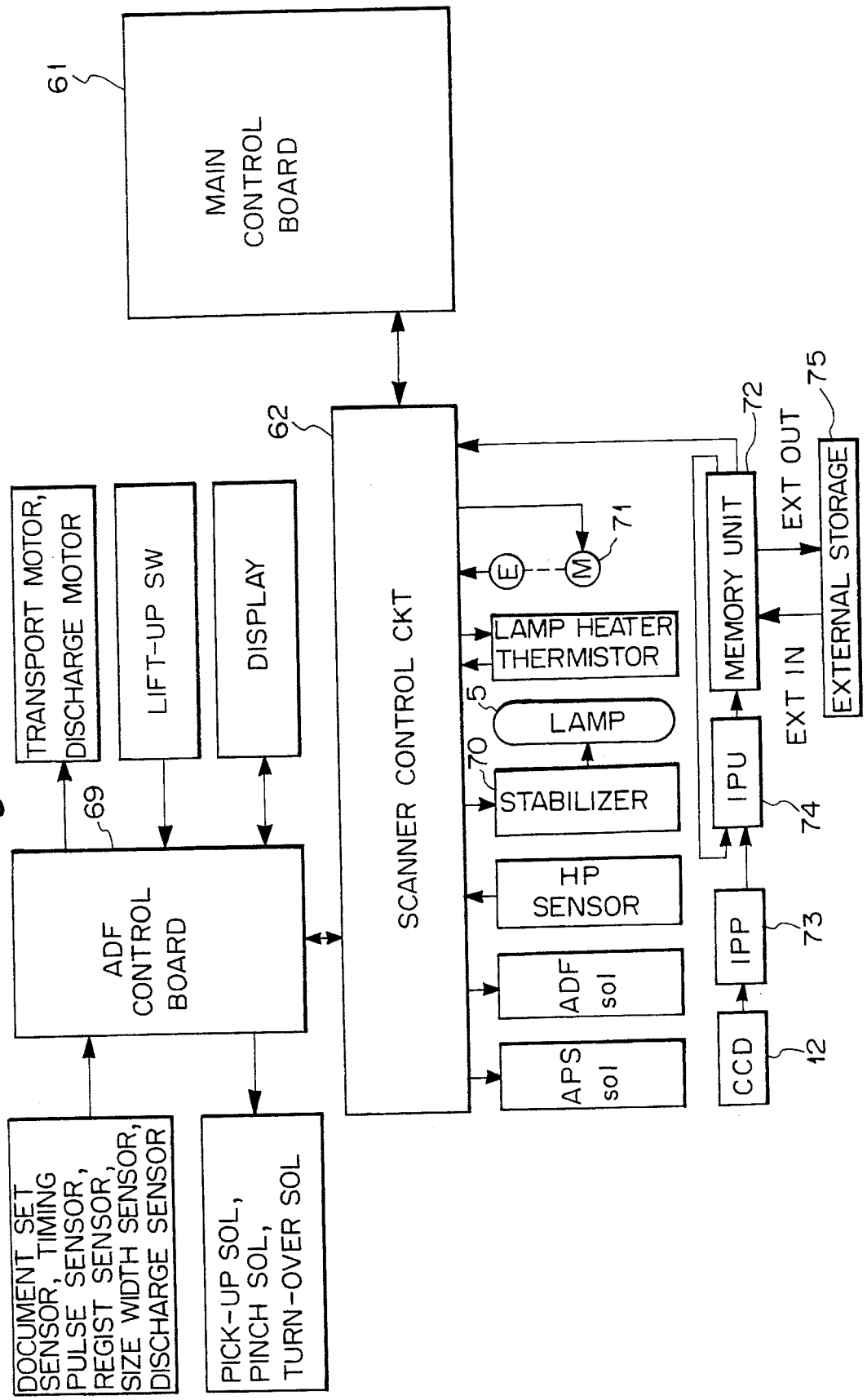
FIG. 9 is a block diagram schematically showing a scanner control section included in the control system, together with the neighborhood thereof.

As shown in FIG. 9, an ADF control board 69 for the ADF 2, a stabilizer 70 for the light source 5, a scanner motor 71 and a memory unit 72, as well as an APS solenoid and an ADF solenoid, are connected to the scanner control circuit 62. The memory unit 72 receives the output signal of the imaging device 12 via an image preprocessor (IPP) 73 and an image processing unit (IPU) 73. An external storage 75 is connected to the memory unit 72.

Referring again to FIG. 8, the power source circuit 68 includes a stoppageless power source 91 via which power is fed from the commercially available power source to AC loads. A DC power source 92 generates a DC voltage and feeds it to the main control board 61 and scanner control circuit 62. For the AC loads, an AC drive board 93, a drive board 94 for a main motor, a drive board 95 for the polygon motor, and a high-tension power source 96 are provided.

Figure 10:
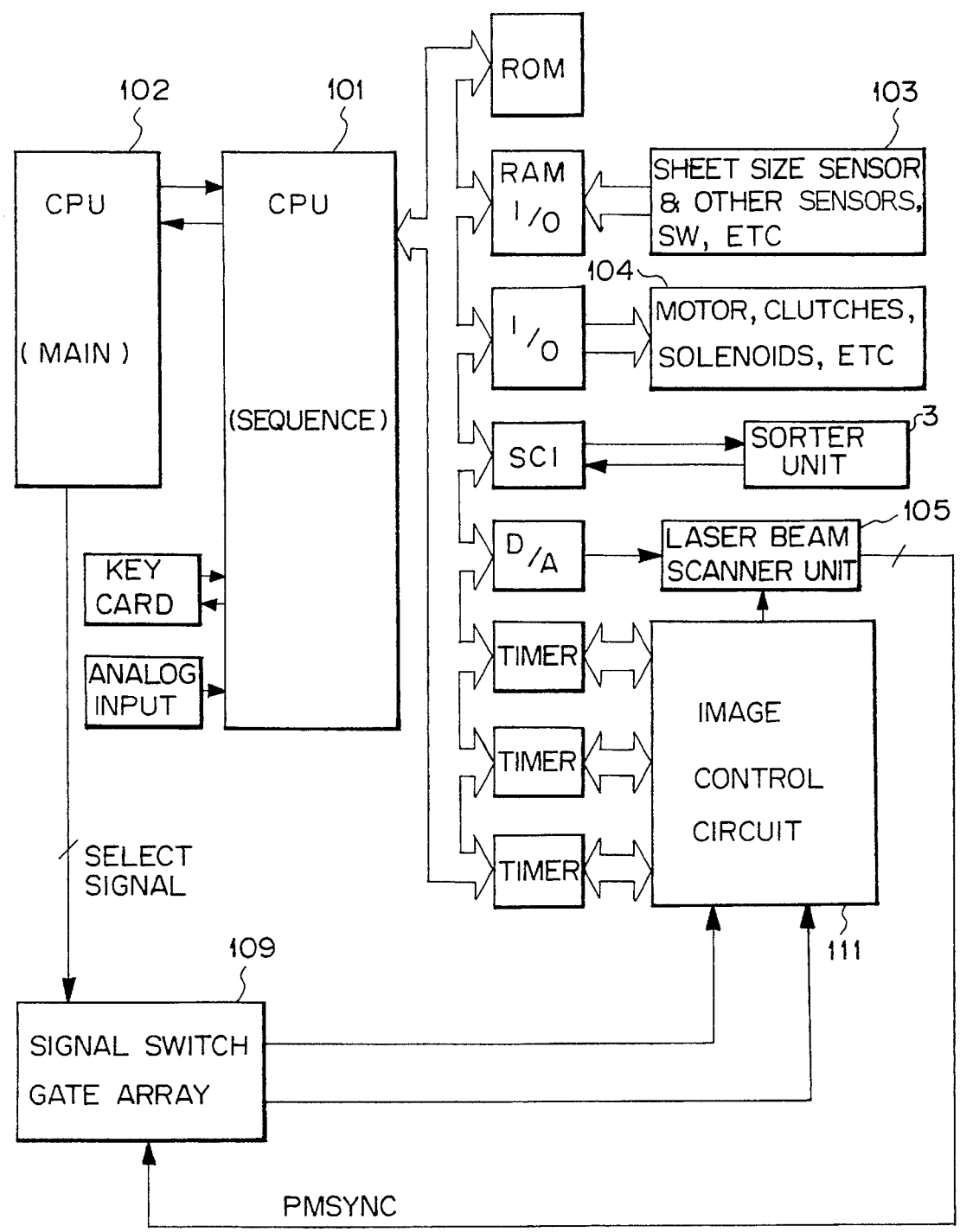
FIGS. 10 and 11 are schematic block diagrams respectively showing a sequence control system and a main control system also included in the control system.
Figure 11:
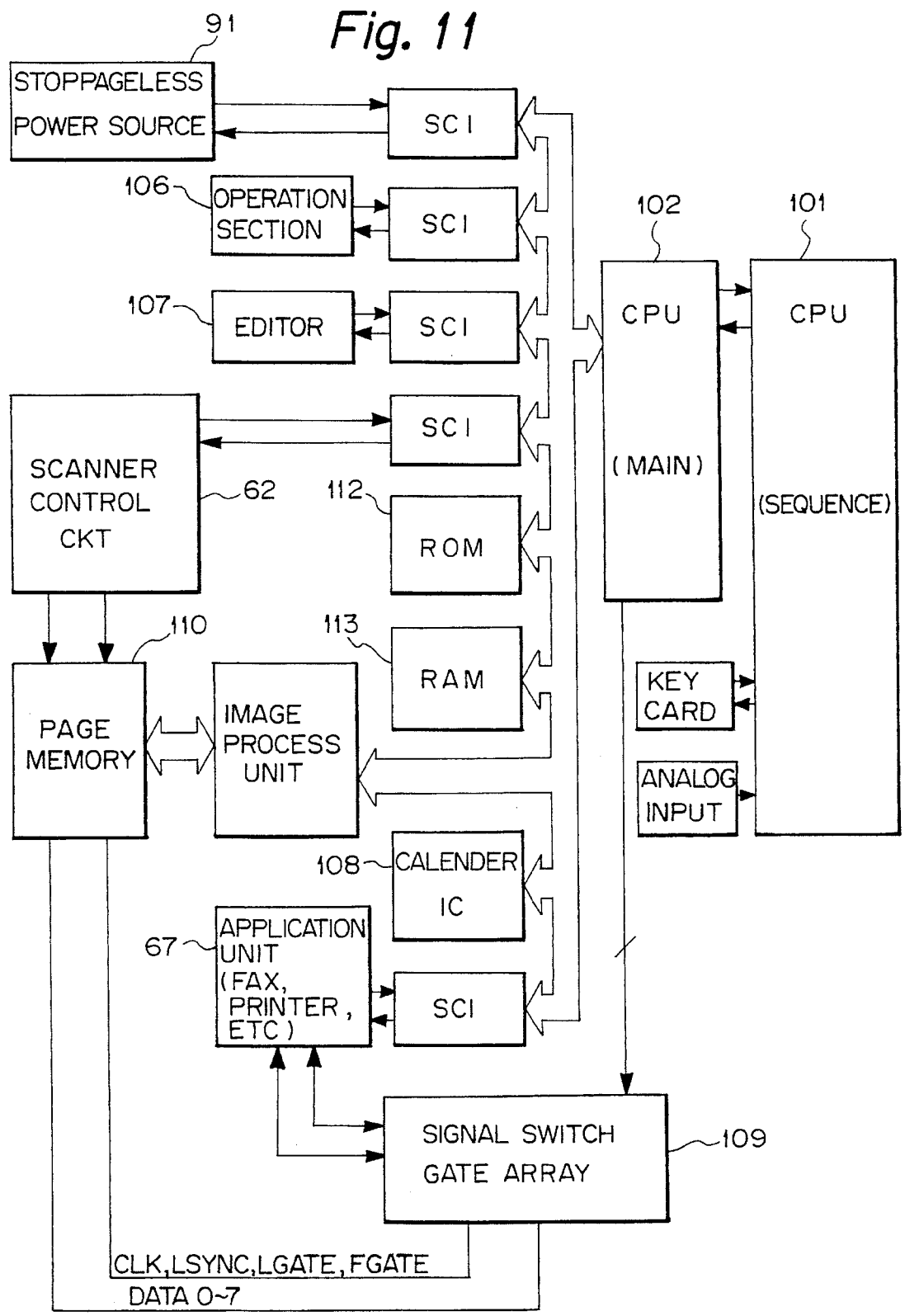

Another aspect of the control system described above is as follows. As shown in FIGS. 10 and 11, the main control board 61 includes two CPUs which are the control units of the digital copier. The CPUs 101 and 102 are in charge of sequence control and operation control, respectively. The CPUs 101 and 102 are interconnected by a serial interface.

To begin with, the CPU 101 for sequence control sets and outputs sheet transport timings and conditions relating to image formation. Connected to the CPU 101 are sensors 103 responsive to sheet size, sheet discharge, sheet registration and other factors relating to sheet transport, drivers 104 for driving the turn-over unit, high-tension power source unit, relays, solenoids and motors, sorter unit 3, and scanner unit 105. Specifically, the sensors 103 include sheet size sensors each generating an electric signal representative of the size and orientation of sheets stacked on the respective cassette 3, sensors responsive to the registration and discharge of sheets, sensors responsive to an oil end condition, toner end condition and other conditions which need replenishment, and sensors responsive to the opening of a door, blow-out of a fuse, and other mechanical errors.

Regarding the reversal unit, there are provided a motor for regulating the sheet width, sheet feed clutches, solenoids for steering sheets, sheet sensors, home position sensors for side fences, and sheet transport sensors. The high-tension power source unit applies to each of the main charger, transfer charger, separation charger and bias electrode for development predetermined high-tension power by a duty determined by PWM (Pulse Width Modulation) control. The PWM control digitizes the outputs of the above-mentioned chargers and bias electrode fed back thereto and controls them to respective target values. The drivers are associated with sheet feed clutches, registration clutch, counters, motors, toner supply solenoid, power relay, fixing heater, etc. The CPU 101 is connected to the sorter unit 3 by a serial interface. In response to a signal from the CPU 101, the sorter unit 3 conveys a sheet at a predetermined timing and discharges it to a particular bin 58.

The CPU 101 receives via analog inputs thereof a fixing temperature, photosensor input, monitor output of the laser 17, reference voltage of the laser 17, outputs of various high-tension power sources fed back thereto, etc. On receiving the output of a thermistor, which is included in the fixing unit 39, the CPU 101 ON/OFF controls or controls the phase of a heater such that the fixing section remains at a constant temperature. Regarding the photosensor input, a photopattern formed at a predetermined timing is input via a phototransistor. The CPU 101 ON/OFF controls the toner supply clutch by determining the density of the photopattern, whereby the toner density is controlled. By so sensing the toner density, it is also possible to detect a toner end condition.

As shown in FIG. 11, the CPU for operation control, i.e., main CPU 102 controls a plurality of serial ports and a calender IC. Connected to the serial ports are the stoppageless power source 91, an operation unit 106, an editor 107, the scanner control circuit 62, and the application unit 67 as well as the sequence control CPU 101.

The operation unit 106 has a display for displaying information keyed in by the operator and the status of the copier. The information keyed in is reported to the main CPU 102 by serial communication. In response, the main CPU 102 determines whether or not the display of the operation unit 106 should be turned on or caused to flash, and sends the result of decision to the operation unit 106 by serial communication. Then, the operation unit 106 selectively turns on or turns off the display or causes it to flash. Further, the main CPU 102 determines operating conditions for the machine on the basis of the input information and reports, at the beginning of a copying operation, the operating conditions to the CPU 101 which is executing sequence control.

As shown in FIG. 9, the scanner control circuit 62 sends information relating to the control to the scanner servo motor and to image processing and reading by serial communication. At the same time, the circuit 62 interfaces the ADF control board 69 and the sequence control CPU 101.

The application unit 67 interfaces the main CPU 102 and external apparatuses (facsimile apparatus, printer, etc.) and interchanges predetermined information therewith. The editor 107 is a unit for inputting an editing function and sends image editing data (masking, trimming, image shift, etc.) to the CPU 102 serially. The calender IC, designated by the reference numeral 108, stores date and time and can be accessed by the CPU 102, as needed. The calender IC, therefore, allows the current time to appear on the display of the operation unit 106 and allows, if a desired ON time and OFF time are set, the power source of the machine to be automatically controlled by a timer.

A page memory 110 stores image data (DATA0 to DATA7). A signal switching gate array 109 selectively outputs, in response to a select signal from the CPU 102, the image data and various synchronizing signals in one of the following three different directions. A first direction is from the scanner control circuit 62 to an image control circuit 111. Specifically, an image signal transferred from the scanner as eight-bit data (four-bit or one-bit data, if desired) are output to the image control circuit 111 in synchronism with a synchronizing signal PMSYNC from a laser beam scanner unit 105. A second direction is from the scanner control circuit 62 to the application unit 108; the image signal or eight-bit data from the scanner are output to the application unit 108 in parallel. In response, the application unit 108 transfers the input image data to a printer or similar output terminal connected to the copier. A third direction is from the application unit 108 to the image control circuit 111. In this case, as an image signal or eight-bit data (four-bit or one-bit data, if desired) is transferred from an input terminal connected to the copier, the application unit 108 transfers it to the image control circuit 111 in synchronism with the signal PMSYNC from the laser beam scanner unit 105. Of course, when the image signal from the outside of the copier is implemented as four-bit or one-bit data, it has to be converted to eight-bit data.

A ROM 112 and a RAM 113 are connected to the CPU 102. The RAM 113 is a nonvolatile memory backed up by a battery, not shown, so that data do not disappear even when the power source is turned off. This allows the contents of various counters including a total copy counter and jam counter, the set illumination of the light source 5, the set temperature of the fixing heater and other various kinds of set values to be stored in the RAM 113. These data may be changed by use of numeral keys, as desired. In addition, priority is given to either the facsimile function or the copying function via the RAM 113, as will be described later specifically.

Figure 12:
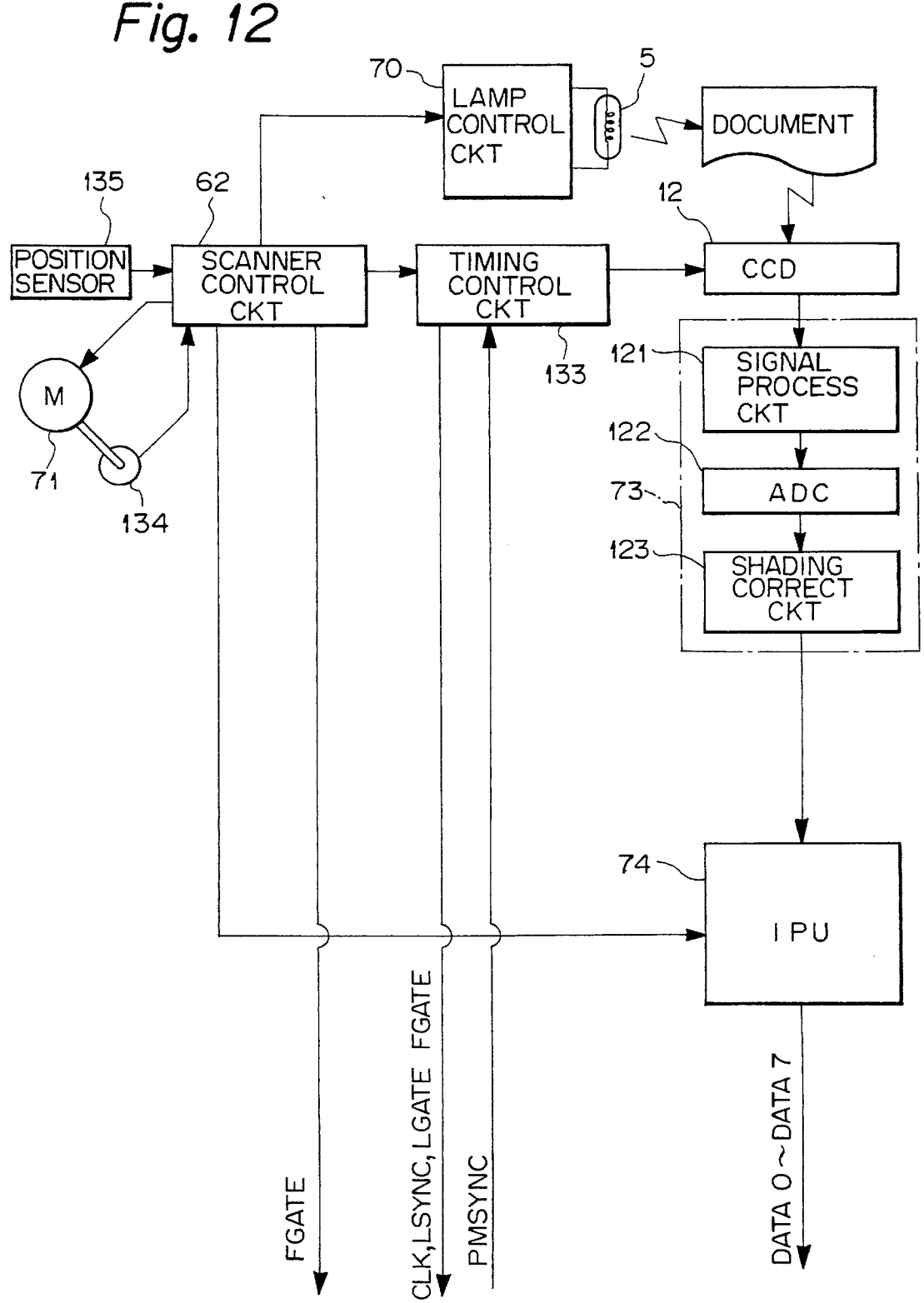
FIG. 12 is a block diagram schematically showing a processing circuit associated with a scanner which is included in the copier.

FIG. 12 shows the image scanner section specifically. As shown, a signal processing circuit 121 is built in the IPP 73. The signal processing circuit 121 amplifies the analog image signal from the CCD image sensor 12 while correcting it with respect to the quantity of light. An analog-to-digital converter (ADC) 122 transforms the analog output of the signal processing circuit 121 to a digital multilevel signal. The digital signal is corrected by a shading correction circuit 123 and then output to the IPU 74.

As shown in FIG. 13, the IPU 74 includes an MTF correction circuit 124 which enhances the high frequency range of the input image signal. A magnification change circuit 125 electrically changes the magnification of the image (in accordance with magnification data in the main scanning direction as set by the scanner control circuit 62).

The output of the magnification change circuit 125 is applied to a gamma (γ) correction circuit 126. This circuit 126 is used to optimally match the input characteristic to the characteristic of the machine. A data depth switching mechanism, generally 127, includes a switch 128 for converting the image signal output from the γ correction circuit 126 to a predetermined quantization level. The switching mechanism 127 has, in addition to the switch 128, a four-bit circuit 129, a binarizer 130, a dither circuit 131, and a switch 132. The switching mechanism 127 transforms the input image signal to any one of three different data types shown in FIGS. 14A, 14B and 14C. To begin with, the four-bit circuit 129 outputs four-bit data shown in FIG. 14B. The binarizer 130 converts the input eight-bit multilevel data to bilevel data by use of a preselected fixed threshold, thereby producing one-bit data shown in FIG. 14C. The dither circuit 131 produces area tonality based on the 1-bit data shown in FIG. 14C. The switch 128 selects one of the three types of data and outputs it as DATA0 to DATA7.

The scanner control circuit 62 controls the stabilizer 70, a timing control circuit 133, the magnification change circuit 125 of the IPU 74, and the scanner drive motor 71, as instructed by the CPU 102. The stabilizer 70 ON/OFF controls the light source 5 while controlling the quantity of light thereof, under the control of the scanner control circuit 62. A rotary encoder 134 is mounted on the output shaft of the motor 71. A position sensor 135 is responsive to the reference position of the subscan drive mechanism The timing control circuit 133 outputs various signals, as instructed by the scanner control circuit 62. Specifically, when the scanner starts reading a document, the circuit 133 delivers to the CCD image sensor 12 a transfer signal for transferring one line of data to a shift register and shift clock pulses for outputting the data of the shift register bit by bit. The circuit 133 feeds to an image reproduction control unit clock pulses CLK synchronous to pixels, main scan synchronizing pulses LSYNC, and a main scan valid period signal LGATE. The clock pulses CLK are substantially identical with shift clock pulses applied to the CCD image sensor 12. The pulses LSYNC are substantially the same as the main scan synchronizing signals PMSYNC output from the beam sensor of the image writing unit 15, but they are output in synchronism with the clock pulses CLK. The signal LGATE goes high at the time when the output data DATA0–DATA7 are regarded valid. In this respect, the CCD image sensor 12 of the embodiment is assumed to output 4,800 bits of valid data line by line.

On receiving a read start command from the CPU 102, the scanner control circuit 62 turns on the light source 5, starts driving the scanner drive motor 71, controls the timing control circuit 133, and thereby causes the CCD image sensor 12 to start reading a document. At the same time, the control circuit 62 causes the valid period signal FGATE to go high. The signal FGATE goes low on the elapse of a period of time necessary for the maximum reading length (in the embodiment, the lengthwise dimension of a sheet of A3 size) in the subscanning direction to be fully scanned.

A reference will be made to FIG. 15 for describing a memory system 141 included in the embodiment. As shown, the image signal from the CCD image sensor 12 is output as 8-bit data via the IPP 73 which executes shading correction, black level correction, and light quantity correction. The data are selected by a multiplexer 142, processed by the IPU 74, and then output to the printer (PR) via a multiplexer 143. The IPU 74 has a high spatial frequency enhancing function (MTF correcting function), speed changing function (magnification changing function), gamma correcting function, and data depth changing function (eight-bits/four-bits/1-bit converting function).

Figure 16:
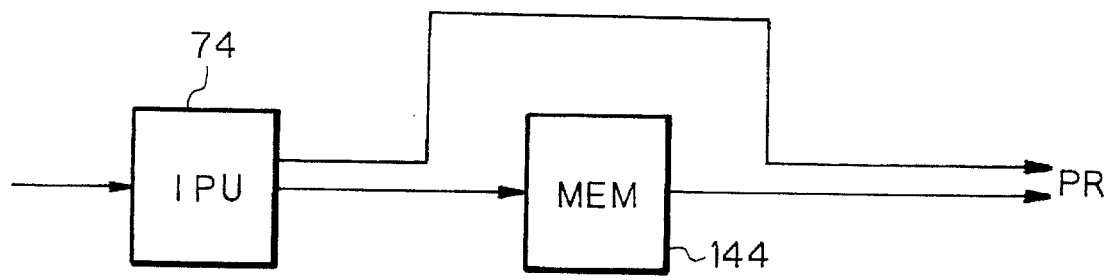
FIG. 16 is a schematic block diagram showing a general construction of the memory system.

Assuming a system having a frame memory for image data, then, as shown in FIG. 16, the image data from the IPU 74 is once written to a memory (MEM) 144 and then read out and fed to the printer (PR), as needed. It is also a common practice to write the image data from the IPU 74 in the memory 144 while transferring it to the printer, so that the second and successive copies may be implemented by the image data stored in the memory 144.

Figure 17:
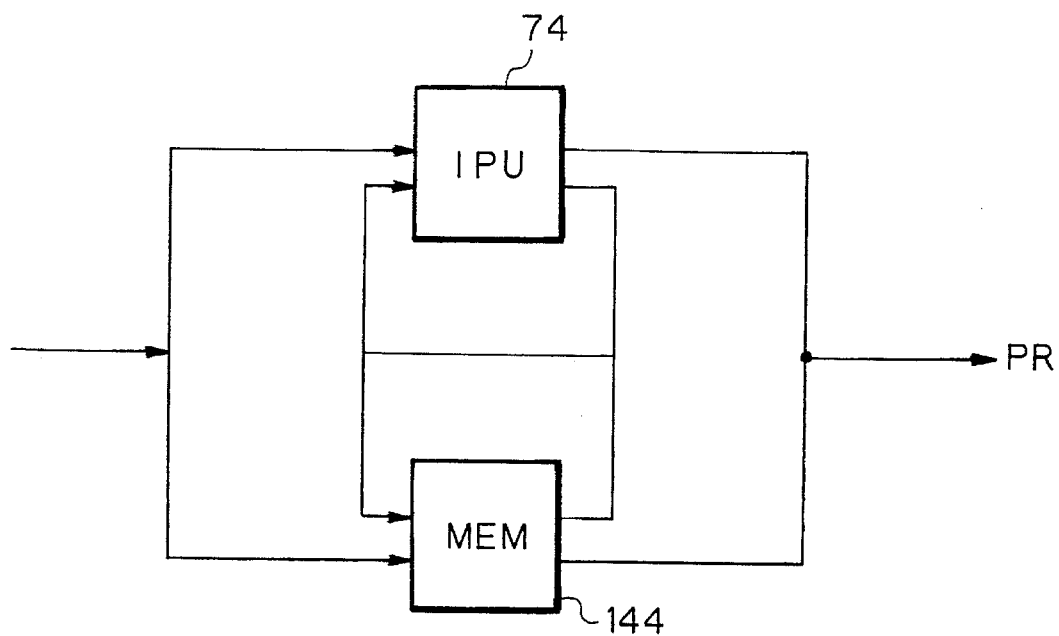
FIG. 17 is a block diagram schematically showing a specific construction of the memory system in accordance with the present invention.

In this respect, the embodiment causes data to flow as shown in FIG. 17 in order to write the data, whether it be the data processed by the IPU 74 or the raw data, in the memory 144. Specifically, the three multiplexers 142, 145 and 143 shown in FIG. 15 are switched over to change the flow of data. For example, assume that a person desires to produce, by a single scanning, a plurality of copies each featuring particular parameters of the IPU 74. This can be done by the following procedure. (1) When the scanner scans a document, the multiplexers 142, 145 and 143 are respectively caused to select inputs A, B and A thereof. In this condition, the first copy is output; the raw data is written to the memory 144 via the multiplexer 145. (2) For the second copy and onward, the multiplexer 142 is caused to select an output B to transfer the data from the memory 144 to the IPU 74; the multiplexer 143 outputs the data to printer PR. At this instant, the parameters of the IPU 74 are changed every time a copy is produced.

When one-bit data or similar compact data is to be retained, the multiplexer 145 selects an input A so as to transfer the output of the IPU 74 to the memory 144. In this case, the printer PR is operated in a bilevel data (one-bit) mode.

In FIG. 15, the signals labeled EXTIN and EXTOUT are respectively an input image data signal and an output image data signal from the external storage 75.

Figure 18:
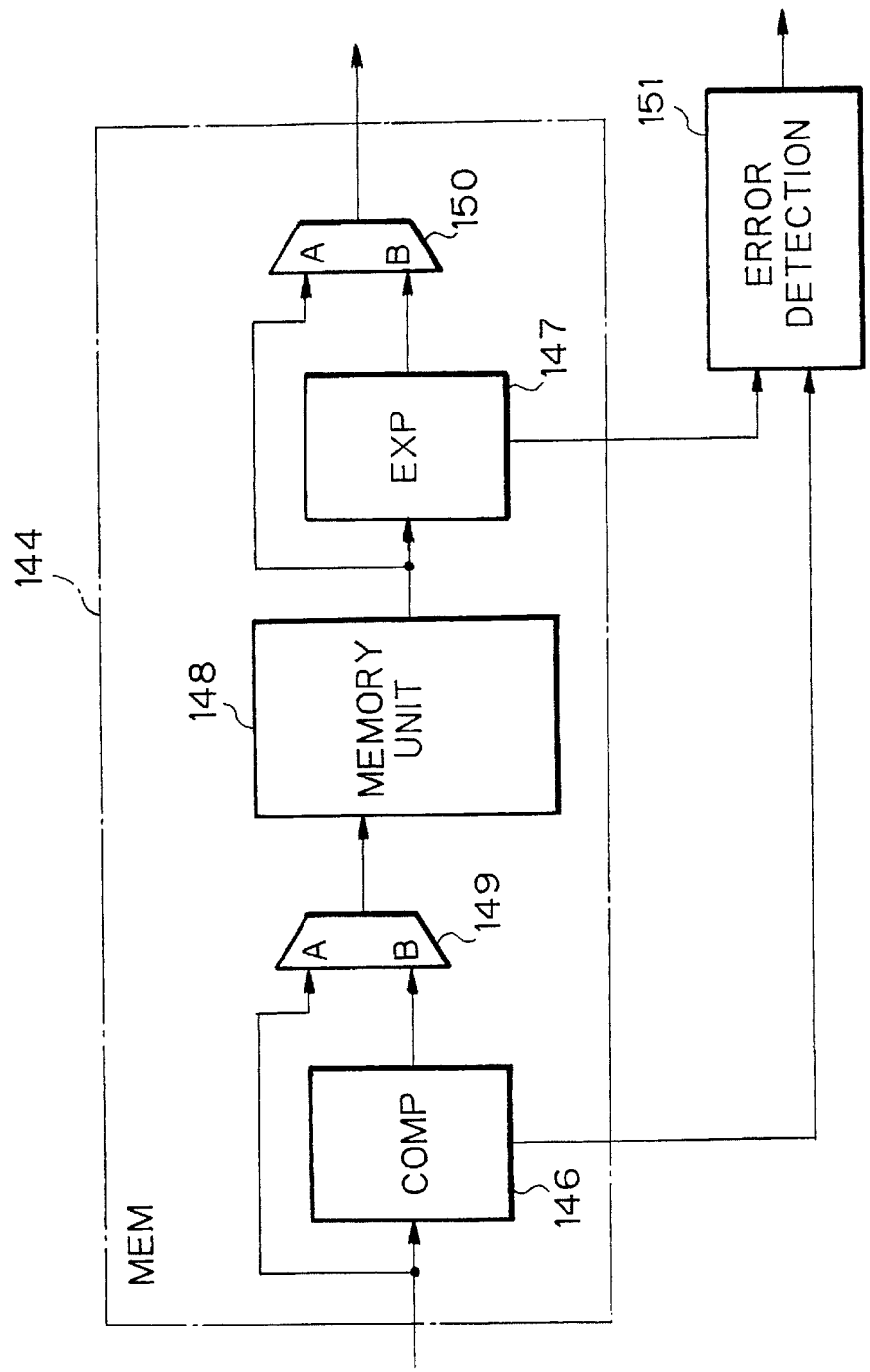
FIG. 18 is a block diagram schematically showing a memory included in the memory system.

FIG. 18 shows a specific configuration of the memory 144. As shown, a compressor (COMP) 146 precedes a memory unit 148 while an expander (EXP) 147 follows the memory unit 148, so that the actual data and compressed data thereof can be selectively written to the memory unit 148. In this configuration, it is necessary for the compressor 146 and the expander 147 to operate in conformity to the scanner speed and the printer speed, respectively. To write the actual data in the memory unit 148, multiplexers 149 and 150 both select their inputs A; to use compressed data, they select their inputs B.

Figure 19:
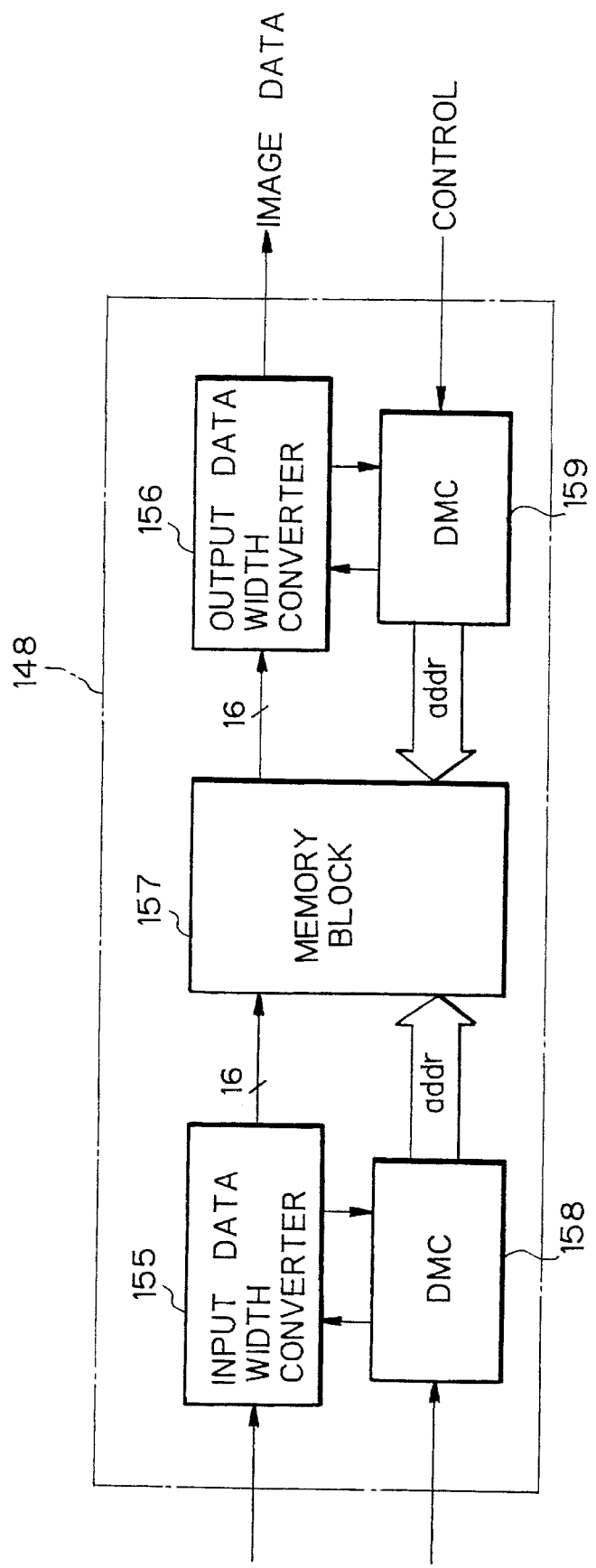
FIG. 19 is a schematic block diagram of a memory unit included in the memory.

The memory unit 148 may be arranged as shown in FIG. 19 specifically. As shown, the memory unit 148 has a memory block 157, a data width converter 155 connected to an input of the memory block 157, and another data width converter 156 connected to an output of the memory block 157. Direct memory controllers (DMCs) 158 and 159 each writes or reads data in or out of predetermined addresses of the memory block 157 in accordance with the number of packed data and the memory data width.

Image data types shown in FIGS. 20A, 20B and 20C will be described. Usually, image data from a scanner or image data to a printer have a constant rate without regard to the number of bits of data, i.e., eight bits, four bits or one bit. That is, the period of one pixel is fixed in an apparatus. In the illustrative embodiment, data are defined as one-bit data, four-bit data or eight-bit data as counted from the MSB (Most Significant Bit) side of eight data lines. The data width converters 155 and 156 each serves to pack and unpack such data from the data width (sixteen bits) of the memory block 157. By packing the data, it is possible to use the memory block 157 in matching relation to the data depth and, therefore, to use the memory 144 effectively.

Figure 21:
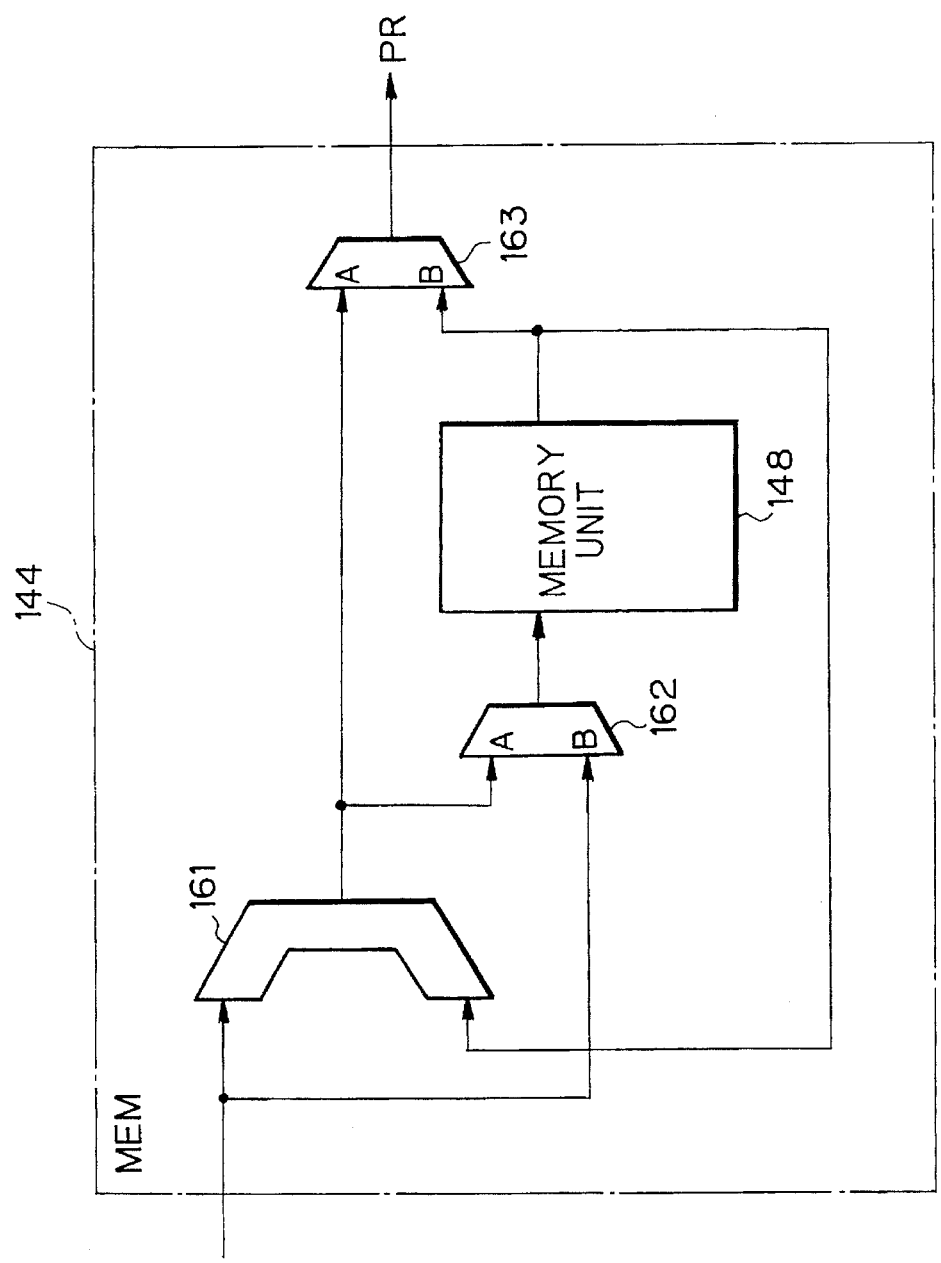
FIG. 21 is a block diagram schematically showing a modification of the memory.

FIG. 21 shows another specific configuration of the memory 144. As shown, the memory 144 has a pixel process unit 161 in place of the compressor 146 and expander 147, of FIG. 18. The pixel process unit 161 is located outside of the memory unit 148 and performs a logical operation between image data (e.g. AND, OR, EXOR or NOT). The pixel process unit 161 has a function of performing calculation with memory output data and input data and outputting the result to the printer PR, and a function of performing calculation with memory output data and input data (e.g. scanner data) and again storing the result in the memory unit 148. Multiplexers 162 and 163 select either the printer PR or the memory unit 148. Generally, this kind of configuration is used to combine different images, e.g., to superpose overlay data stored in the memory unit 148 beforehand on scanner data.

Figure 22:
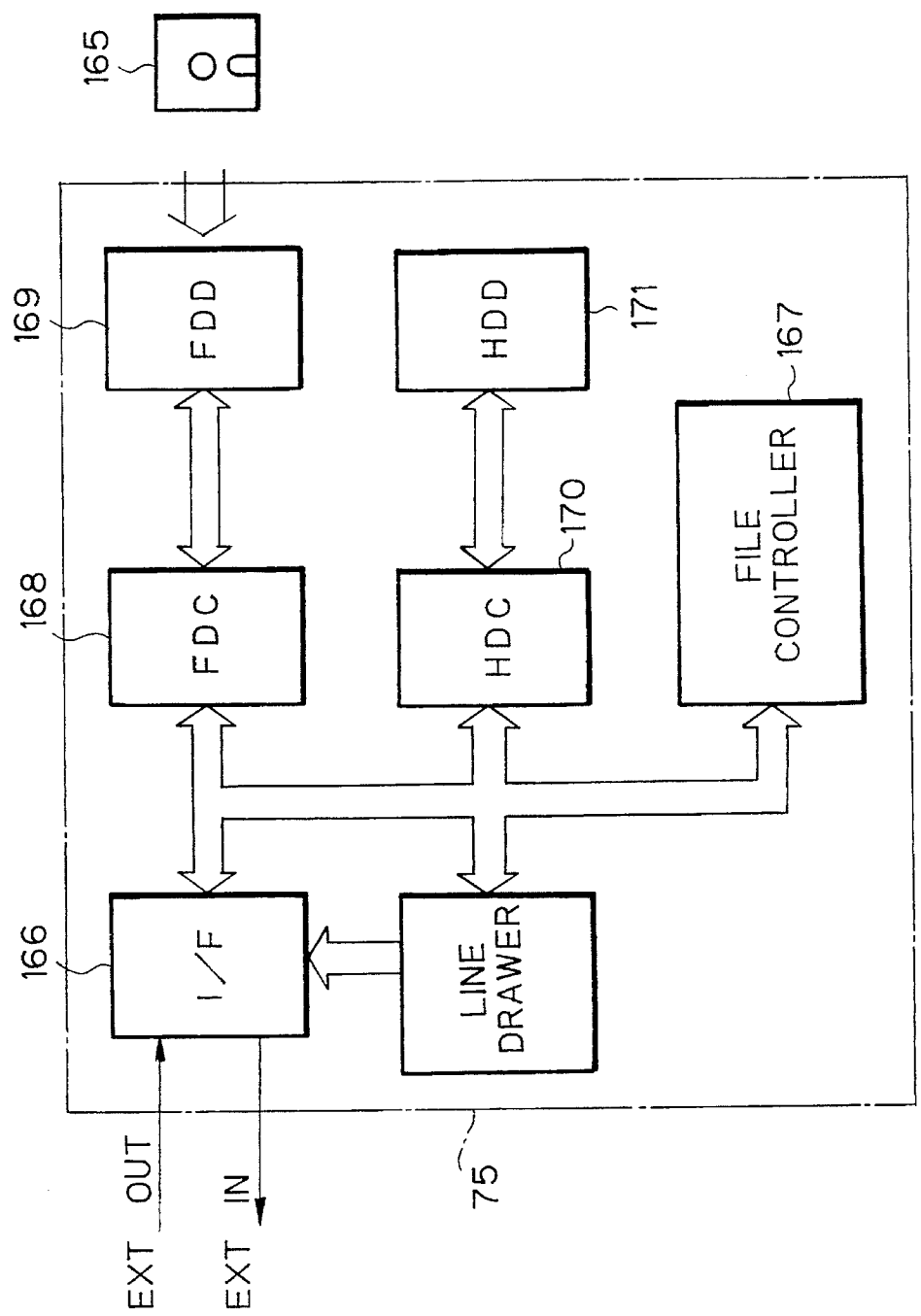
FIG. 22 is a block diagram schematically showing an external storage.

FIG. 22 shows a specific arrangement for storing image data in the external storage 75. Assume that image data should be written to a floppy disk 165 mounted on a floppy disk drive (FDD) 169. Then, image data is routed through the EXTOUT and an interface (I/F) 166 to a floppy disk controller (FDC) 168 which is controlled by a file controller 167. The FDC writes the image data on to the floppy disk 165. A hard disk controller (HDC) 170 and a hard disk drive (HDD) 171 are also controlled by the file controller 167, so that the image data may be written to or read out of a hard disk (not shown). In practice, format data and overlay data, which are used often, are stored in the HDD 171 beforehand and are accessed, as needed.

Figure 23:
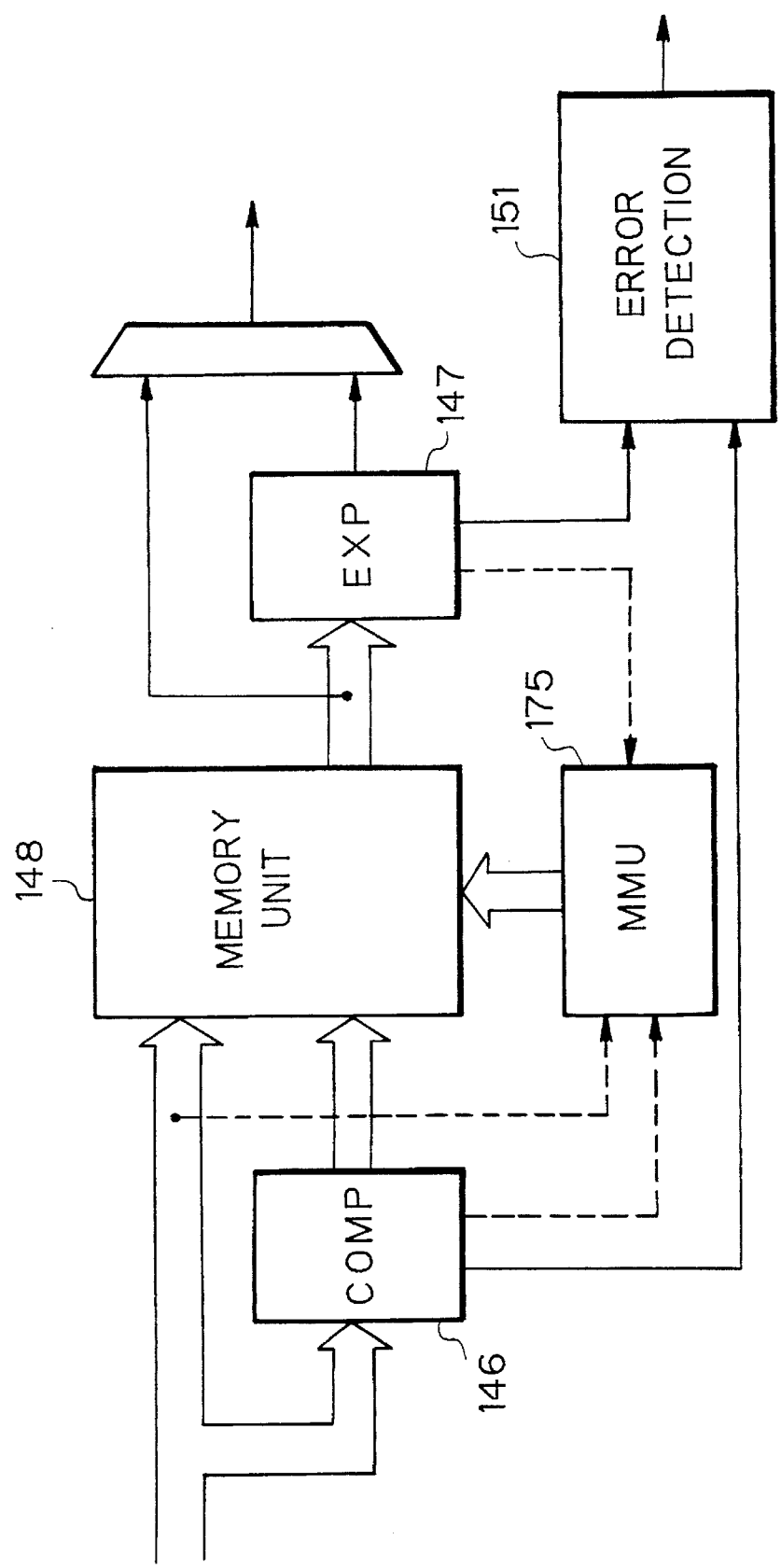
FIG. 23 is a block diagram schematically showing another modification of the memory.

FIG. 23 shows an arrangement which insures a 100% recovery even when the compression rate and expansion rate are short. Compressed data and image data are written to the memory unit 148 at the same time as the operation of the scanner. While the input data are written to respective memory areas, the compressed data are directly applied to the expander 147. When the compressor 146 and expander 147 both complete their processing before one page of data are fully written to the memory unit 148, only the memory area for the compressed data is left, i.e., the area for the raw data is cancelled. When an error detector 151 detects an error signal from either the compressor 146 or the expander 147, the compressed data area is immediately cancelled so as to use the raw data. A memory managing unit (MMU) 175 controls the memory unit 148 in such a manner as to allow it to receive two input data and send one output data at the same time. By detecting the real-time compression and expansion, the arrangement insures rapid and sure operation as well as the effective use of the memory areas. While the MMU 175 allocates the memory area dynamically, the memory unit 148 may be replaced with two memory units, one for the raw data and the other for the compressed data, if desired.

In any case, the arrangement of FIG. 23 is optimal for applications in which the number of stored documents and the print speed have to be consistent with each other, e.g., an application in which a plurality of documents are stored and output to a printer on a real time basis, as in electronic sorting.

Figure 24B:
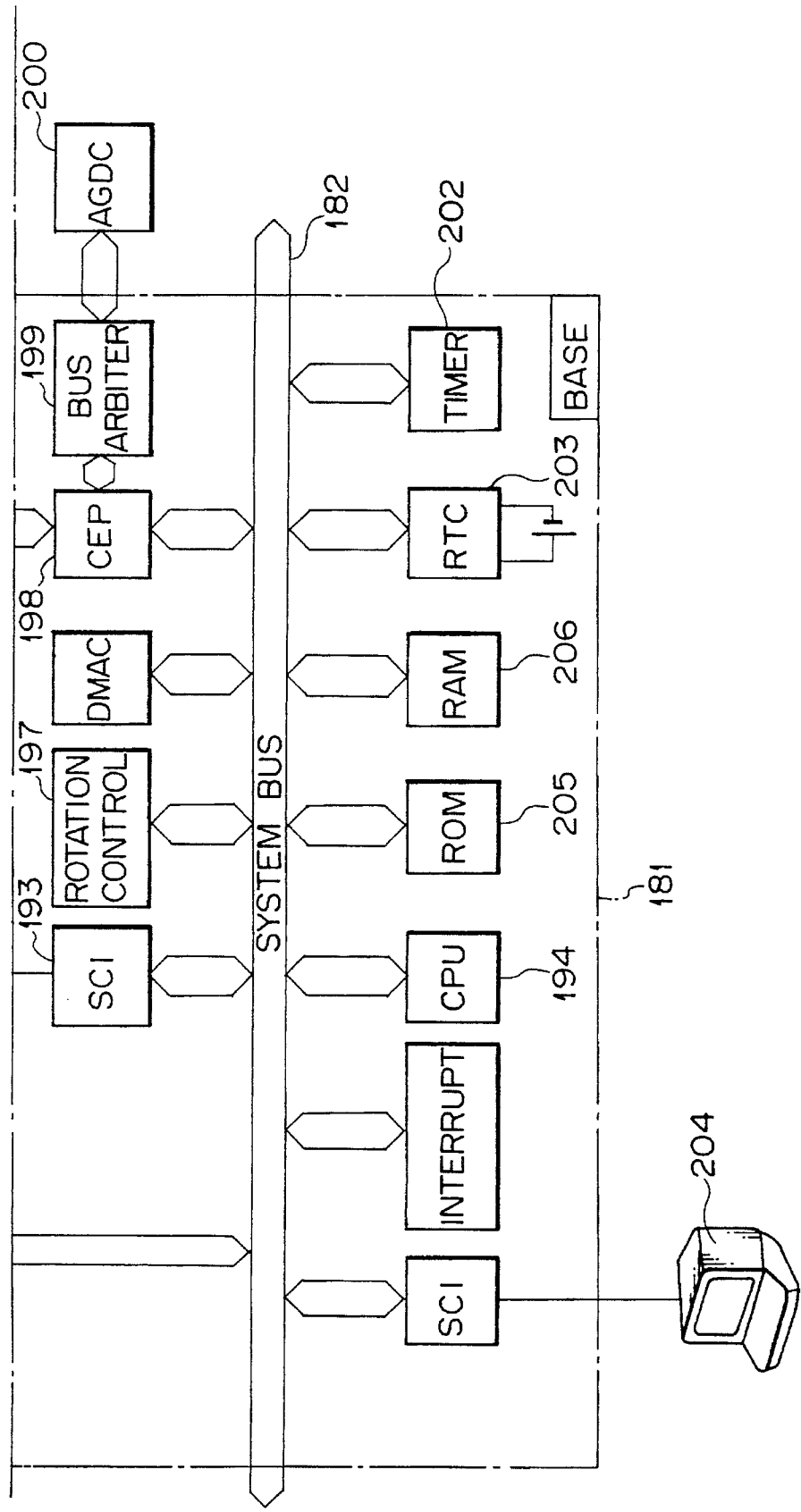
FIG. 24 is a block diagram schematically showing an application unit, mainly a base unit thereof.

A reference will be made to FIGS. 24–27 for describing the application unit 67. As shown in FIG. 24, the application unit 67 has a base unit 181 having a system bus 182. A file unit (APL1) 183, a facsimile unit (APL2) 184, an on/off printer unit (APL3) 185, a LAN (APL 4) 186, a T/S & LCD (DISPLAY) 187, and an image processing unit (APL5) 188 are connected via the system bus 182.

To begin with, the base unit 181 will be described with reference to FIG. 24. An engine I/F 191 converts serial image data to parallel data while converting parallel data from a page memory 192 to serial data, sending the resulting data via the EXTIN terminal. Control signals are serial and applied to the system bus 182 via the engine I/F 191 and a serial communication interface (SCI) 193. In the specific construction, the page memory 192 has an area broad enough to accommodate one A3 size page. The page memory 192 executes bit image conversion and, in addition, arbitrates the data rate of EXTIN and EXTOUT and the processing rate of the CPU 194. A magnification change circuit 195 enlarges or reduces the image data stored in the page memory 192. To effect high speed processing, the magnification change circuit 195 is operated without the intermediary of a CPU 194 under the control of a direct memory access controller (DMAC) 196. Assuming that in the event of facsimile transmission, a document being sent is of A4 size and fed in the vertically long position, while a sheet at a receiving station is of A4 size and is fed in the horizontally long position, then, the document being sent would be automatically reduced to 71% and would be illegible at the receiving station. In light of this, a rotation controller 197 rotates, when the sheets at the transmitting and receiving stations are of the same size, but fed in different orientations, the document to be sent by 90 degrees to allow the image data to be sent although the orientations are different. Further, assume that the received document requires horizontal feed while a sheet for reception is to be fed vertically, then, the rotation controller 197 rotates the received image 90 degrees. As a result, it is not necessary to distinguish the cassettes with respect to the vertical/horizontal orientation. A CEP 198 is a circuit having image data compressing, expanding and pass through functions. A bus arbiter 199 is a circuit for transferring data from an AGDC 200, included in the on/off printer unit (APL3) to an image bus 201 or transferring them to the system bus 182. A timer 202 generates a predetermined clock. An RTC 203 is a timepiece and generates the current time. A console 204 is a control terminal which is accessible for writing and reading data out of the system. Also, the console 204 may be used to develop software via a debug tool which is one of the functions available with an internal operating system OS. A ROM 205 stores the OS and other basic functions. A RAM 206 is mainly used for a working purpose.

Figure 25:
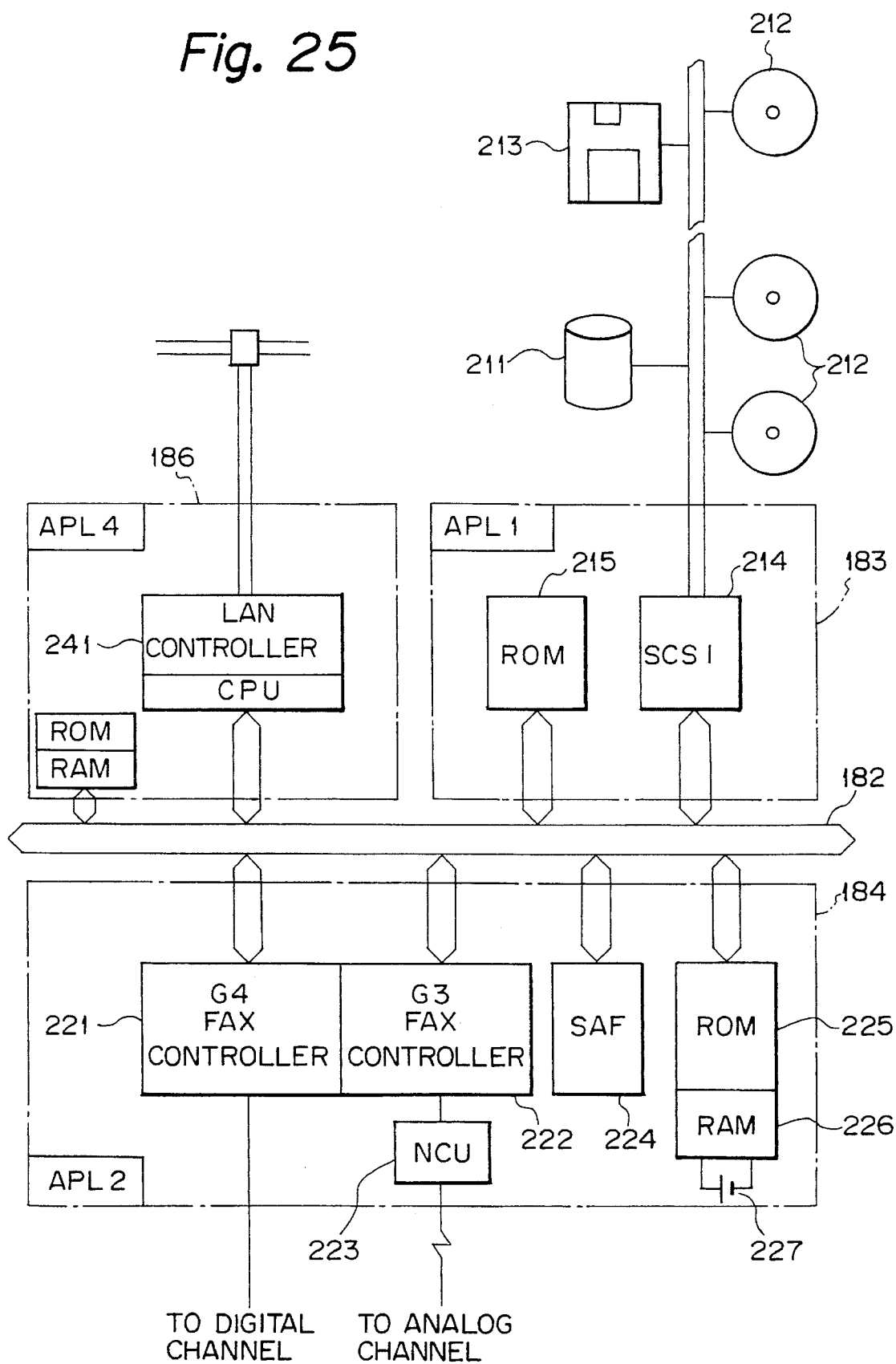
FIG. 25 is a block diagram schematically showing the application unit, mainly applications APL1, APL2 and APL4 thereof.

FIG. 25 shows the file unit (APL1) 183 specifically. As shown, the file unit 183 has an interface (SCSI) 214 for a hard disk 211, an optical disk 212, and a floppy disk 213. The SCSI 214 is connected to the system bus 182. A ROM 215 stores software which plays the role of a filing system for controlling the hard disk 211, optical disk 212 and floppy disk 213 via the SCSI 214.

The facsimile unit (APL2) 184 will also be described with reference to FIG. 25. As shown, the facsimile unit 184 has a G4FAX controller 221 for controlling a protocol assigned to the G4 standard. The controller 221 is capable of supporting classes 1–3 belonging to the G4 standard. Of course, the controller 221 also supports an ISDN. In the NET 64, the controller 221 is capable of selecting one of G4/G4, G4/G3, G3/G4, G4 only, and G3 only since 3B+1D (64 kB+16 kB) channels are available. A G3 FAX controller 222 controls a protocol assigned to the G3 standard; a modem is provided for transforming the G3FAX protocol on an analog channel and a digital signal to analog signals. A network control unit (NCU) 223 connects to a remote station via a switch, accepts a call terminating from the remote station, and dials the remote station. A store-and-forward (SAF) 224 stores image data (including code data) in the event of facsimile transmission/reception. The SAF 224 is implemented by a semiconductor memory, HDD or ODD by way of example. A ROM 225 stores a program for controlling the facsimile unit 184. A RAM 226 is used for a working purpose. Also, backed up by a battery 227, the RAM 226 stores the telephone numbers and names of remote stations, and data for controlling the facsimile function as well as other data. Such data can be readily set by use of an T/S 262 and an LCD 247 included in the display unit 187 (see FIGS. 24 and 28).

Figure 26:
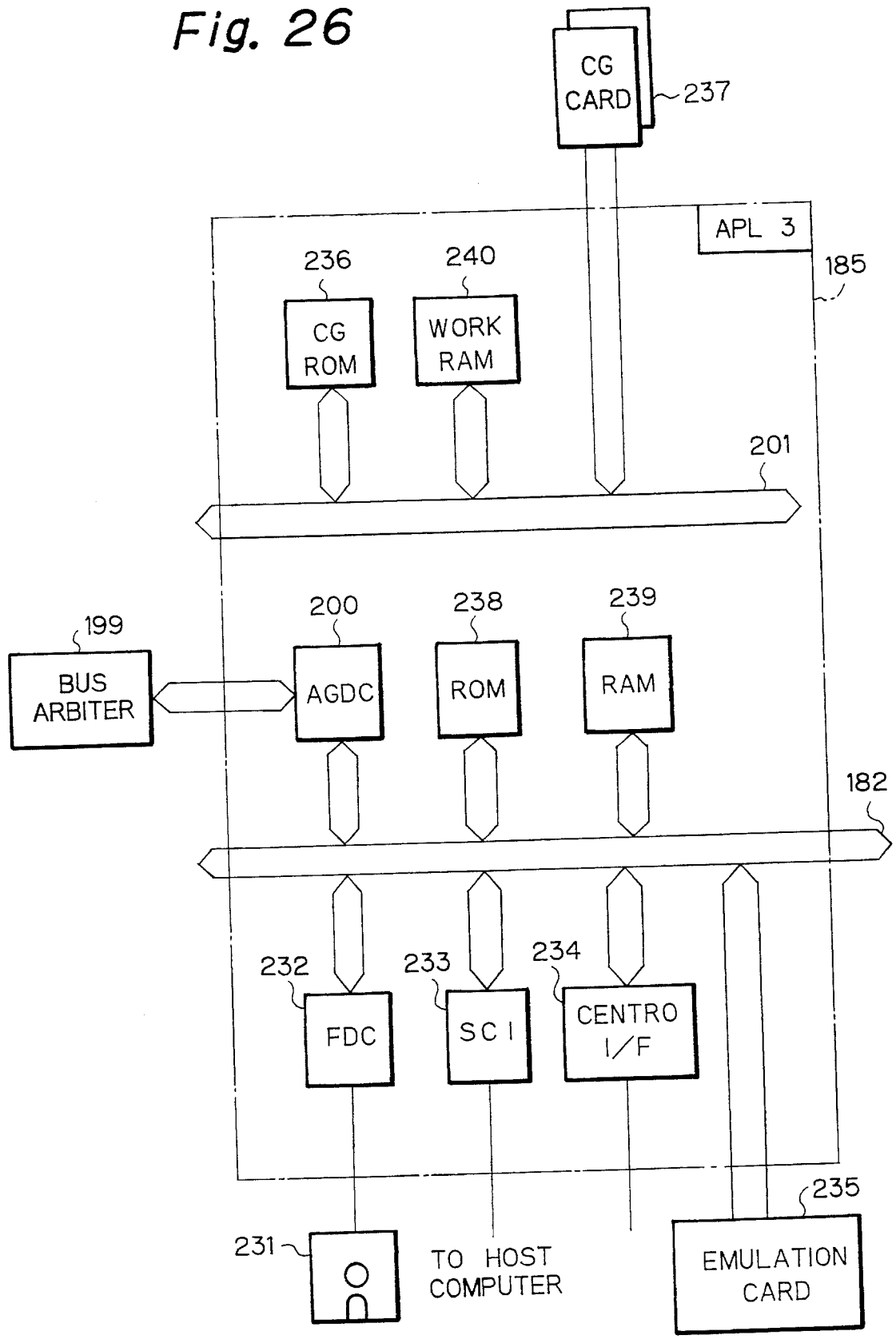
FIG. 26 is a block diagram schematically showing the application unit, mainly an application APL3 thereof.

FIG. 26 shows the on/off printer unit (APL3) 185 specifically. The on/off printer unit 185 controls an on-line printer and an off-line printer and includes an FDC 232 connected to the system bus 182. The FDC 232 controls the floppy disk 231. Some of advanced floppy disks 231 support an SCSI interface. In the specific configuration, the floppy disk 213 is assumed to support the SCSI and ST506 interface. A serial communication interface (SCI) 233 is used for the connection to a host computer (not shown). A centronics I/F 234 is similar to the SCI 233.

An emulation card 235 is used for the following purpose. When the printer is seen from the host computer side, the printer slightly changes in specifications from one manufacturer to another. The software installed in the host computer will not run unless the printer has the same specifications as seen from the host computer side. The emulation card 235 allows the printer to operate as a printer available from any one of different manufacturers.

An advanced graphic display controller (AGDC) 200 writes code data received from the host computer in a character generator ROM (CGROM) 236 and writes font image read out of a CG card 237 in the page memory 192 at high speed. A ROM 238 stores software for controlling them. The CGROM 236 further stores font data, including an outline font, and matching code data. The CG card 237 is removably mounted to the machine and similar to the CGROM 236 in respect of contents.

Referring again to FIG. 25, the LAN (APL4) 186 will be described specifically. As shown, a LAN (Local Area Network) controller 241 with a CPU controls a LAN, e.g., Ethernet or Omni currently in operation. It is to be noted that the facsimile unit 184 and LAN 186 are operable in the background even when the other application units 183, 184, 183 and 185 are in operation.

Figure 27:
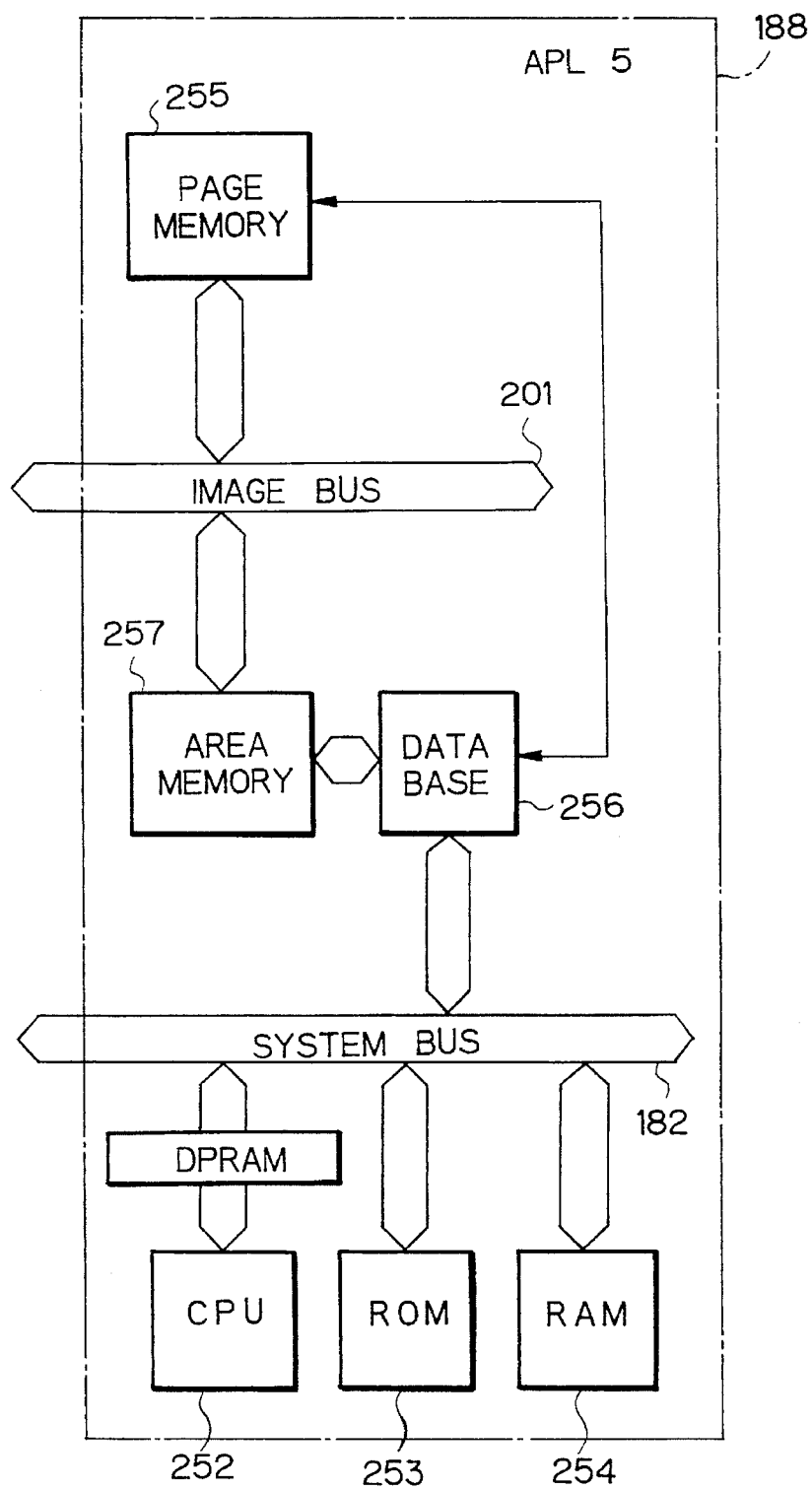
FIG. 27 is a block diagram schematically showing the application unit, mainly an application APL5 thereof.

The image processing unit (APL5) 188 determines the orientation of the image read by the scanner 1A. As shown in FIG. 27, the unit 188 has a CPU 252, a ROM 253, a RAM 254, a page memory 255, a data base 256 and an area memory 257 which are interconnected by the system bus 182 and an image bus 201.

Figure 28:
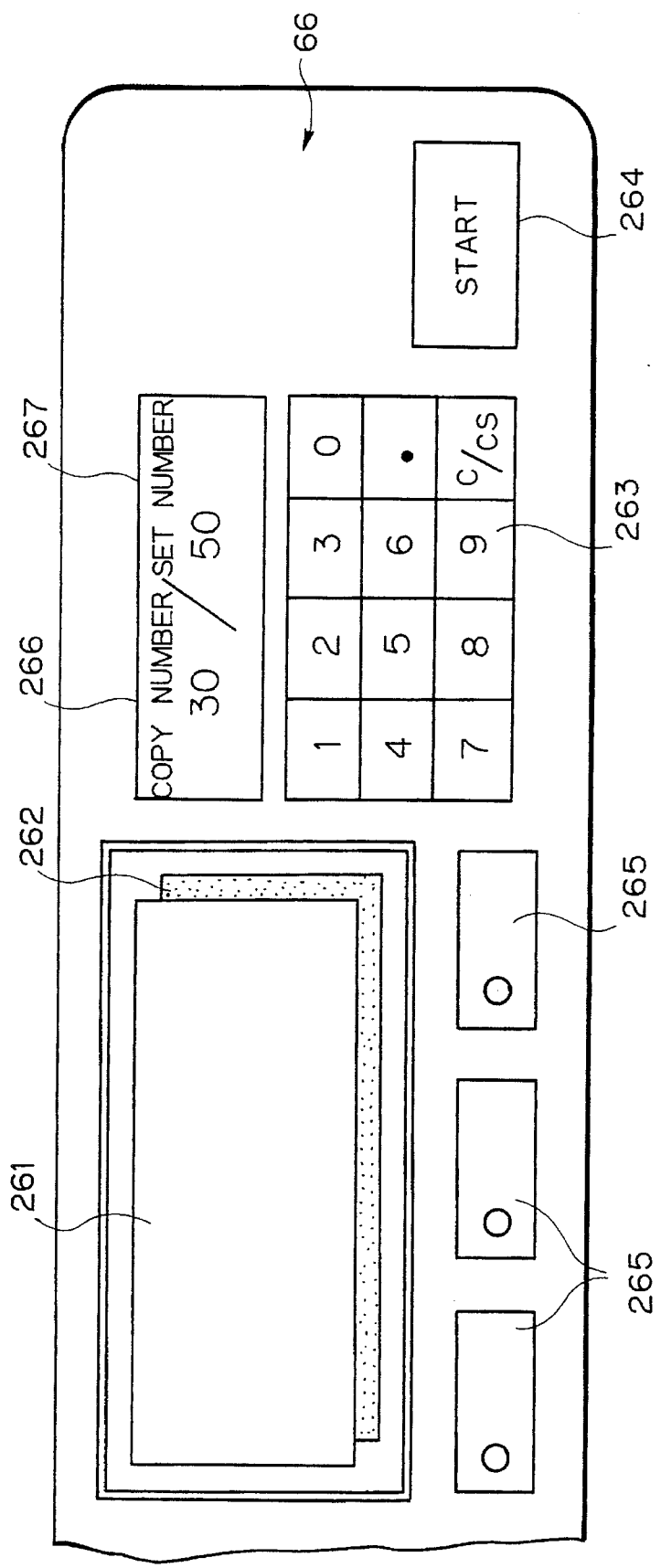
FIG. 28 is a plan view of an operating section shown in FIG. 8.

The T/S (Touch Switch)and LCD (Liquid Crystal Display) 187 will be described with reference to FIGS. 24 and 28. As shown, the T/S & LCD 187 controls an operating section 66 provided with an LCD and touch switches. The T/S & LCD 187 has a CPU 241, a TS controller 242, a ROM 234, a RAM 244, a character generator (CG) 246, an LCD controller 247, and an interface 248. The LCD 261 is capable of displaying graphic data and character data. The CG 246 stores codes representative of the second level of ANK and kanji. A touch switch controller (TSC) 242 controls touch switches 262. The touch switches 262 are divided by an X-Y lattice. The size of the individual touch switches 262 can be freely selected if a desired number of openings of the lattice is selected for each key via the TSC 242. As shown in FIG. 28, the LCD 261 and touch switches 262 are provided in a double layer structure; the key size and the key frame of the LCD match each other.

Referring also to FIG. 28, the operating section 66 has fixed keys including numeral keys 263 for entering, for example, a desired number of copies, a start key 264 for entering a copy start command, and user-oriented function keys 265 which may be freely assigned to a sort mode, staple mode, duplex copy mode, etc. A copy number display portion 266 and a set number display portion 267 are fixed display portions; the other information are displayed on the LCD 261. The LCD 261, provided with a touch switch structure, allows the user to select desired modes by pressing objects appearing thereon.

The facsimile function of the digital copier will be described in relation to the application unit 67. Regarding the facsimile function, the copier accommodates MF, G2, G3 and G4 and transmits data at a density of 3.85 lines/mm, 7.7 lines/mm or 4 lines/mm. For G4 facsimile, the copier supports densities of 200 dpi, 240 dpi, 300 dpi and 400 dpi and interchanges them based on the magnification changing capability. Further, by using the SAF 224, the copier implements memory transmission/reception, relay, confidential reception, polling, etc. In addition, the copier is capable of effecting memory transmission, memory reception, received data output and other functions at the same time while writing a document to be sent in a memory.

Figure 29:
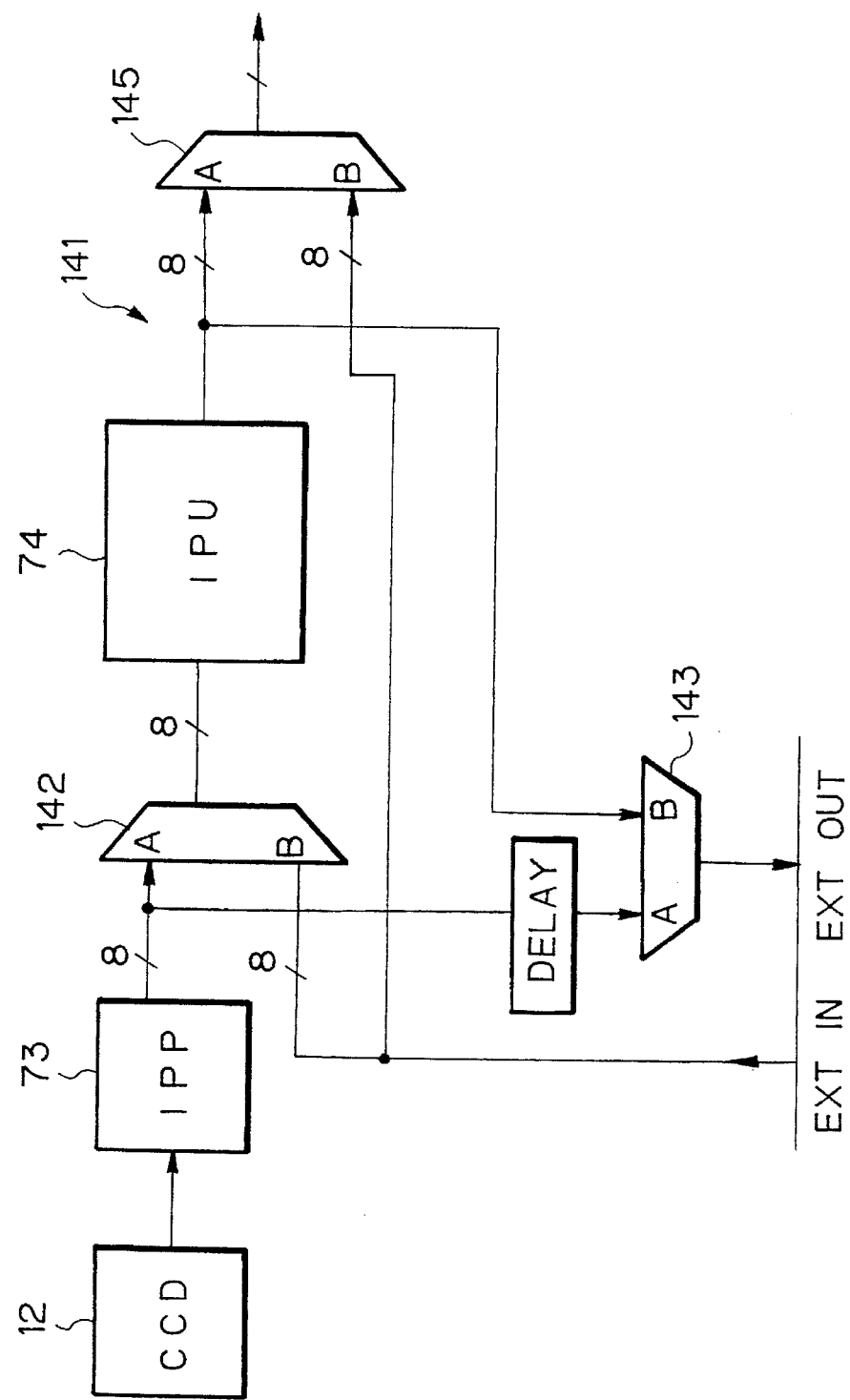
FIG. 29 is a schematic block diagram of a document reading and processing circuit.

To begin with, a transmission procedure will be described. When the operator sets a document or documents on the copier and then presses the start key 264, the copier dials a desired remote station stored in the RAM 226. On confirming that the other party is a facsimile apparatus, the copier starts reading the document. As a result, data is output to the EXTOUT terminal via a circuit shown in FIG. 29. At this instant, it is assumed that whether or not to use the IPU 74 shown in FIG. 30 can be determined by selecting the multiplexers 142 and 143, and that the functions of assigned to the IPU 74 are freely selectable based on a program. The data from the EXTOUT terminal is sent to the engine I/F 191, in FIG. 24, and sequentially written to the page memory 192 in conformity to the bit size of the memory 192. This is because the data from EXTOUT are in the form of multilevel data having eight bits for a pixel while the page memory 192 is provided with a sixteen-bit configuration.

Figure 30:
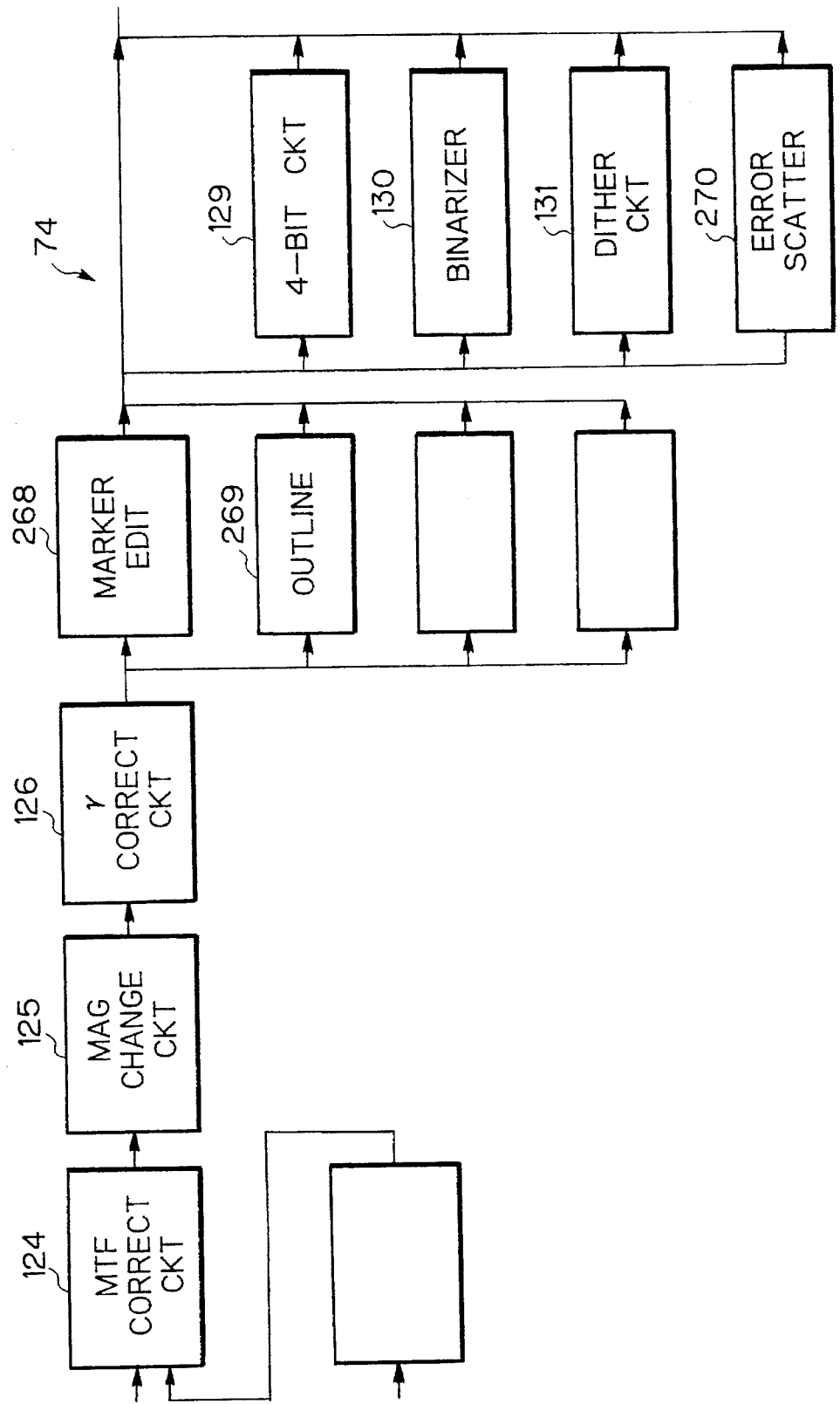
FIG. 30 is a schematic block diagram of an image processing unit included in the circuit of FIG. 29.

It is to be noted that the IPU 74 shown in FIG. 30 is additionally provided with a marker editing circuit 268, an outline circuit 269, and an error scattering circuit 270.

When the data from the scanner is written to the page memory 192, the data are sequentially written to the SAF 224 via the system bus 182 while being compressed and, at the same time, transferred to the G3FAX controller 222 from the SAF 224.

Transmitting the data from the scanner while storing them in the SAF 224, as stated above, has the following advantages. To begin with, the scanner can read a single document of A4 size in about 2 seconds, but about 9 seconds are necessary for an image of A4 size to be sent by a G3 facsimile; the transmission time is about 4.5 times as long as the image reading time. However, in a multiplex copier, facsimile and printer apparatus, as in the present embodiment, it often occurs that the next person desires to copy documents while the apparatus is sending facsimile data. In such a case, although the facsimile transmission should preferably be completed as soon as possible, the transmission speed is sometimes high and sometimes low, depending on the performance of the remote station. In this respect, transmitting data while storing them in the SAF 224 is desirable since it increases the transmission speed in an apparent sense. In addition, since the document data being sent are stored in the SAF 224, they can be surely sent, by resending or redialing, even when an error occurs during transmission or when the channel is disconnected by accident.

Figure 31:
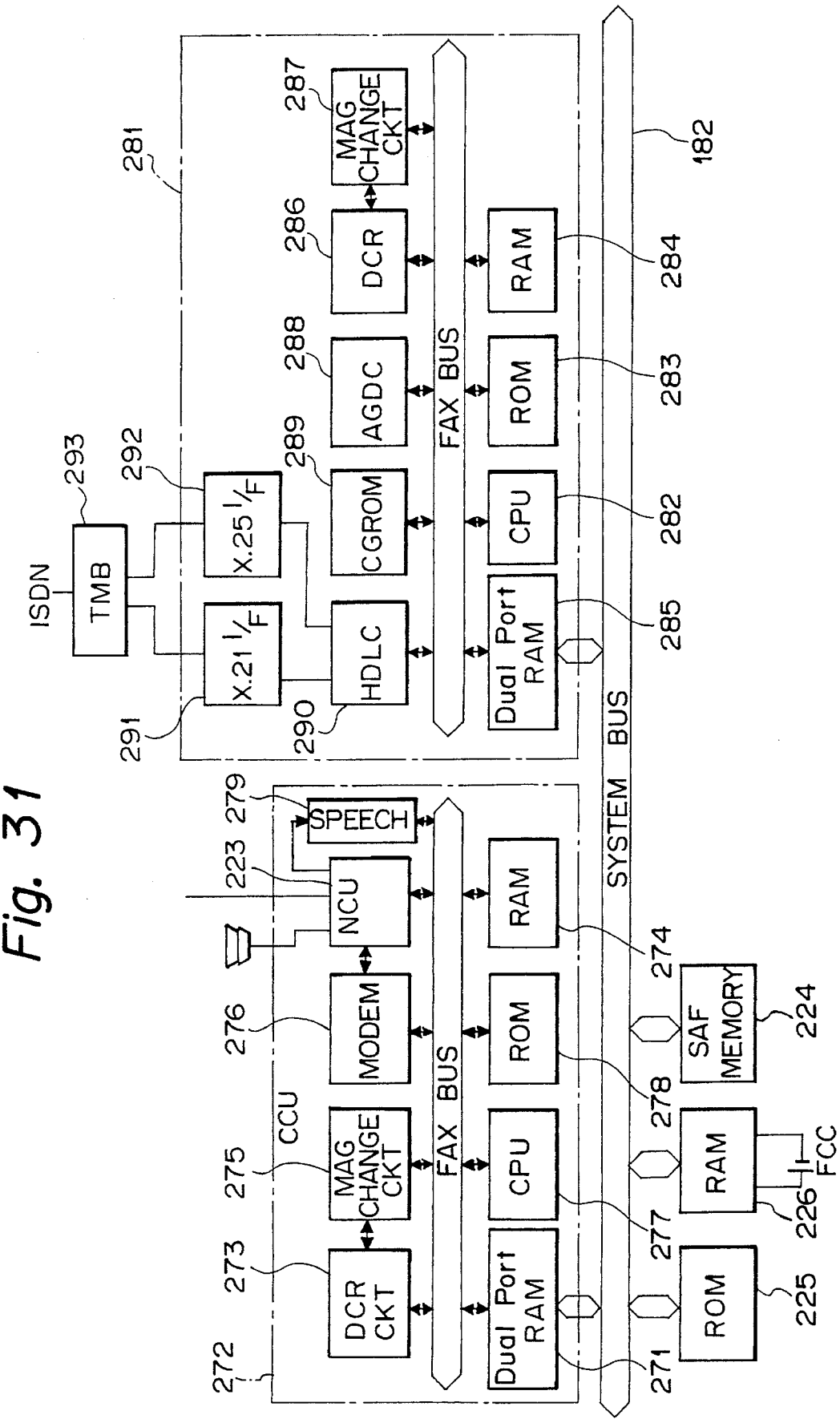
FIG. 31 is a block diagram schematically showing a facsimile channel and a protocol control system.

FIG. 31 shows a control system for controlling a G3/G4 facsimile channel and protocol. Let the facsimile channel be a G3 channel. The compressed data (MH, MR, raw data or code data) from the SAF 224 is applied to a G3FAX section 272 via a dual port RAM 271. In the G3FAX section 272, the data from the SAF 224 have the document size and density thereof matched to the modes of a remote station. For example, assume that the transmitting station transmits a document of A4 size in an image density of 15.4 lines/mm and in the MMR compression mode, and that the receiving station receives data in a size of A4 in an image density of 15.4 lines/mm and in the MH compression mode. Then, the document to be sent is matched to the reception modes by a DCR function and a magnification change function. Specifically, a CDR circuit 273 retransforms RRM data stored in the dual port RAM 271 to raw data and causes the raw data to be temporarily written to a RAM 274 (line-by-line processing). Subsequently, a magnification change circuit 275 changes the magnification of the raw data stored in the RAM 274 to match them to the receiving station. The resulting raw data from the DCR circuit 273 are compressed by the DCR circuit 273 in conformity to the receiving station. The compressed data are sent out to a subscriber line via a modem 276 and the NCU 223 while being written to the dual port RAM 271. The reason the compressed data are written to the RAM 274 is that although the transmission rate on the channel is constant, the data in transmission should be prevented from breaking off due to the compression rate which depends on data. In FIG. 31, the DCR circuit 273 is constructed to switch over compression/expansion on a line basis. Also included in the F3FAX section 272 are a CPU 277, a ROM 278, and a speech circuit 279.

A G4FAX section 281, like the G3FAX section 272, has a CPU 282, a ROM 283, a RAM 284, a dual port RAM 285, a DCR circuit 286, and a magnification change circuit 287. In addition, the G4FAX section 281 has an AGDC 288, a CGROM 289, and an HDLC 290. The HDLC 290 is connected to an ISDN channel via a x.21 I/F 291 or a x.25 I/F 292 and a TMB 293.

Figure 32:
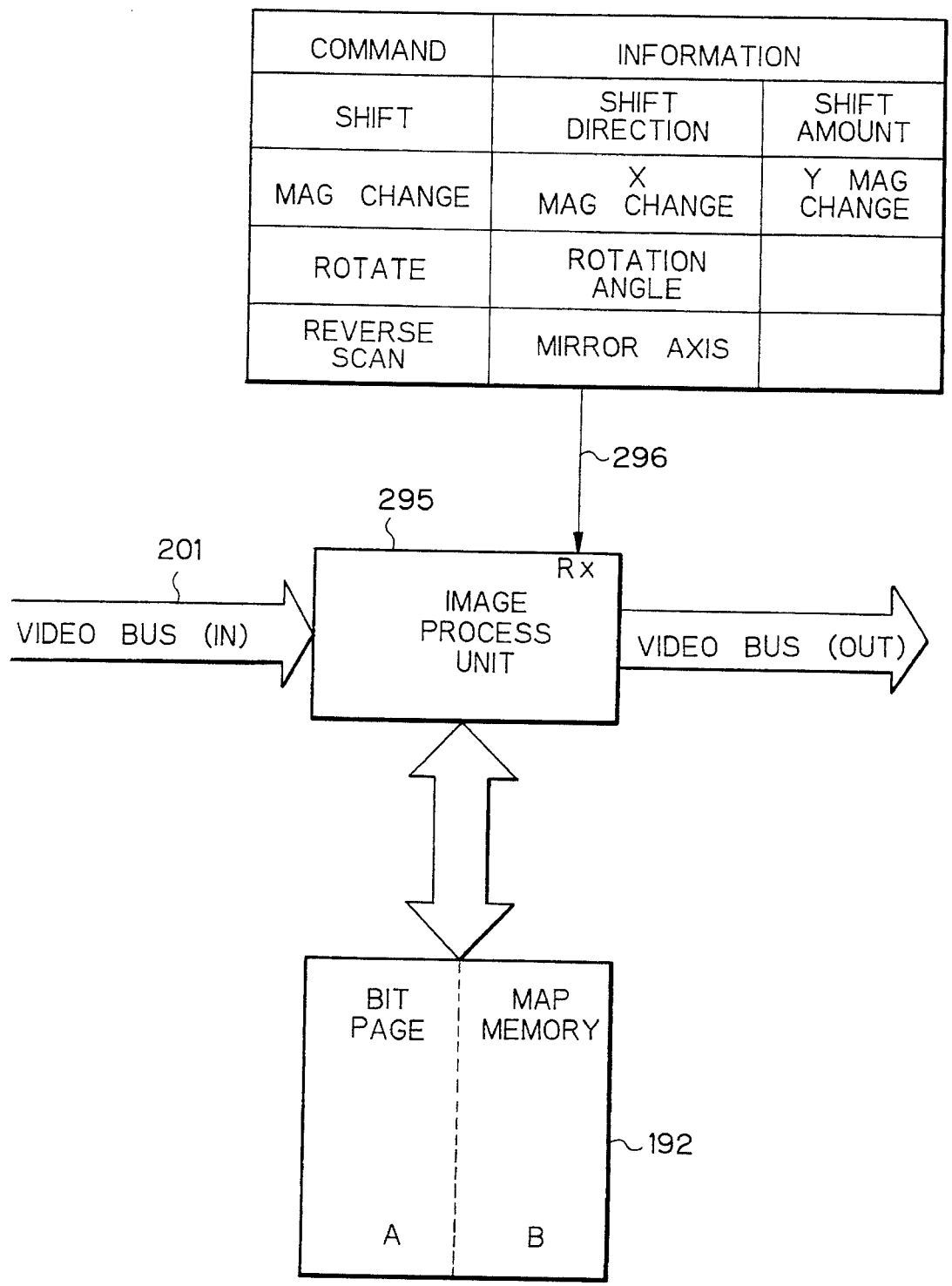
FIG. 32 is a block diagram for describing an image processing function.

FIG. 32 is a block diagram schematically representing the image processing functions particular to the base unit 181, of FIG. 24. As shown, an image processing unit 295 can access a bit map page memory 192. The bit map page memory 192 has a capacity great enough to store two documents of a maximum size which can be copied by the copier, so that the original image data are preserved. Specifically, the memory 192 has an area A for storing original image data, and an area B for storing image data processed by an image processing unit 295. Connected to the image processing unit 295 are the image bus or video bus 201 and an image process command 296.

The image bus 201 is an eight-bit data bus and has eight bits, i.e., 256 tones for a pixel. The image process command 296 is fed from the main CPU 102 to the image processing unit 295 via the system bus 182. For the process command 296, a particular code is assigned to each image processing function. For an image shifting function, for example, a shift code, a shift direction and a shift dimension are sent from the CPU 102. For a magnification changing function, a magnification change code, an X magnification change ratio and a Y magnification change ratio are sequentially sent from the CPU 102. Of course, the X and Y magnification change codes will represent an identical value in an ordinary magnification change mode. In addition, a rotation command will be accompanied by a rotation angle code.

In the illustrative embodiment, the bit map page memory 192 capable of accommodating two documents is used as storing means for storing image data in a two-sided document copy mode. Specifically, in a two-sided document copy mode using the ADF 2, an image representative of the second side of the document read by the scanner 1A is first written to the area A of the memory 192. Subsequently, after the document has been turned over, the scanner 1A reads the first side of the document. The resulting image data are written to the area B of the memory 192. In parallel with the storage to the area B, the image data representative of the second side are read out of the area A and printed out by the printer 1B. After all the image data representative of the second image have been printed out, the image data representative of the first side are read out of the area B and printed out by the printer 1B. At the same time, the ADF 2 replaces the document with the next two-sided document and reads it in the same manner.

Figure 1A:
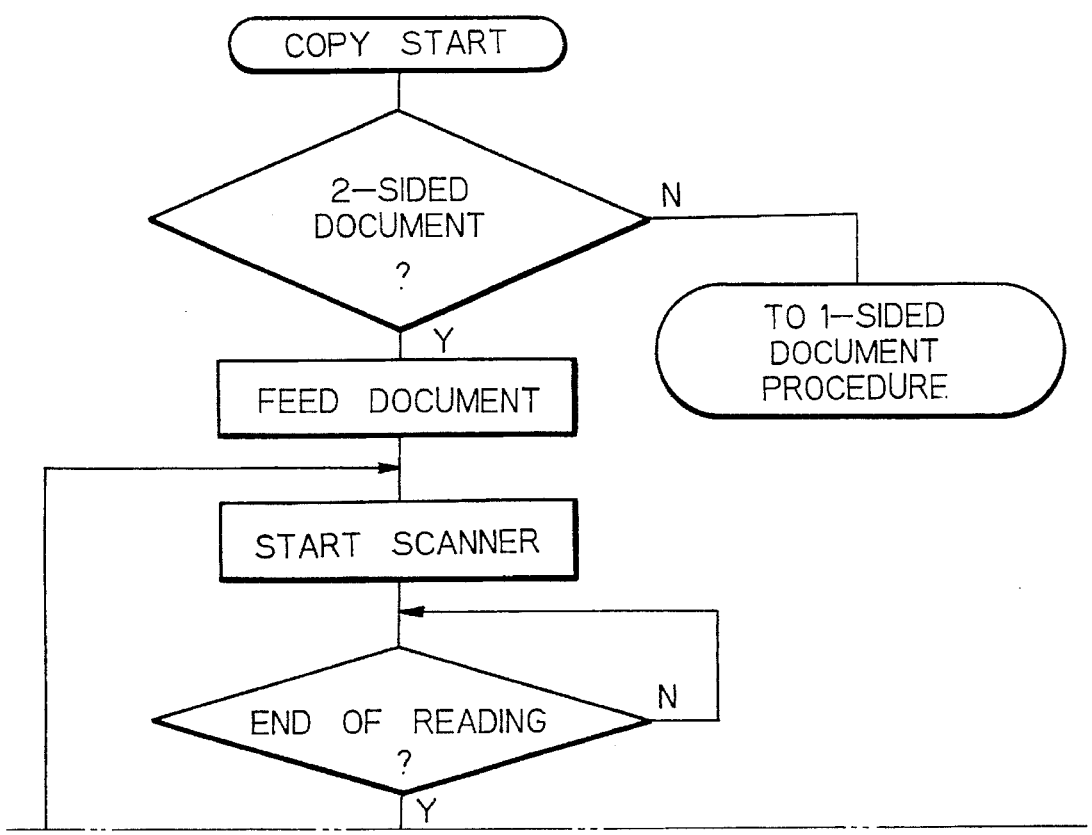
FIG. 1 is a flowchart representing a control method embodying the present invention.
Figure 1B:
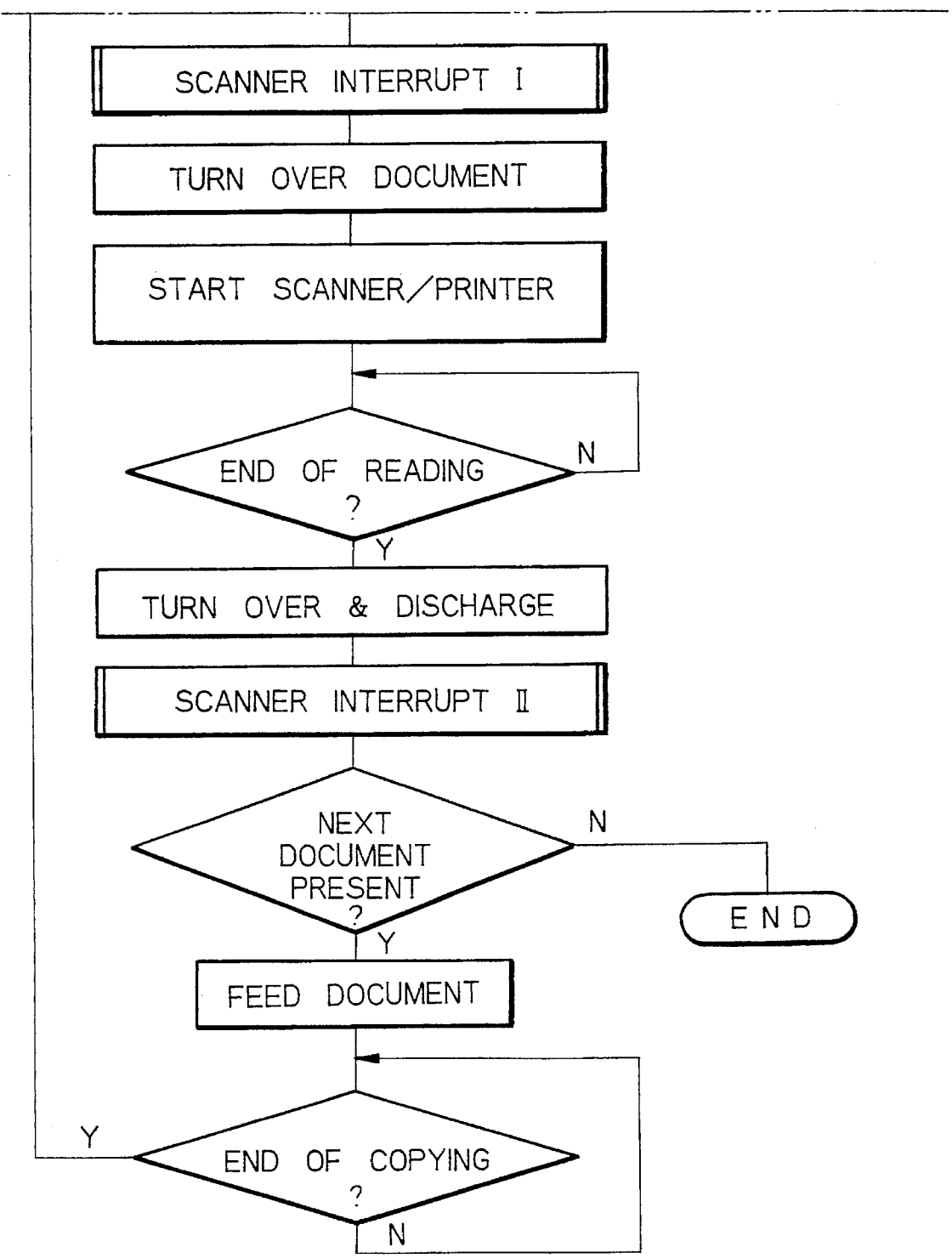

FIG. 1 is a flowchart demonstrating the above-stated two-sided document copy mode specifically. One-sided documents will be dealt with by a different routine. As shown, after the ADF 2 has fed a two-sided document, the scanner 1A starts reading the document. The resulting image data are sequentially written to a memory (bit map page memory 192). At this instant, since the document has been turned over by the turn/discharge section 55 and set on the glass platen 9, it is the second side (rear) of the document that is read by the scanner 1A. After the second side of the image has been fully read, a scanner interrupt I subroutine is executed. Subsequently, the document is turned over by the ADF 2. As the scanner 1A reads the first side (front) of the document, the resulting image data are written to the memory (bit map page memory 192). In parallel with this storage, the image data stored in the memory and representative of the second side are read out and printed out. After the first side of the document has been fully read, the document is driven out to the discharge tray 56 while the image data of the second and first sides are continuously printed out. After the document has been driven out to the tray 56, a scanner interrupt II subroutine is executed. Subsequently, whether or not another two-sided document is present is determined, and it is fed if present. Once the second and first sides of the previous document are fully printed, the memory can be safely rewritten. Hence, the second and first sides of the next document are read in the same manner as those of the previous document, stored in the memory, and printed. Such a procedure is repeated the number of times corresponding to the number of documents.

It will be seen that the control over the two-sided document copy mode described above allows a two-sided document to be replaced with the next two-sided document before it is fully printed. Hence, the replacement of a document, which is time-consuming due to the turn-over of a document, can be efficiently effected in parallel with print-out. Specifically, even when image data representative of a preceding document are being printed out, the ADF 2 can replace the document with the next document.

Figure 2:
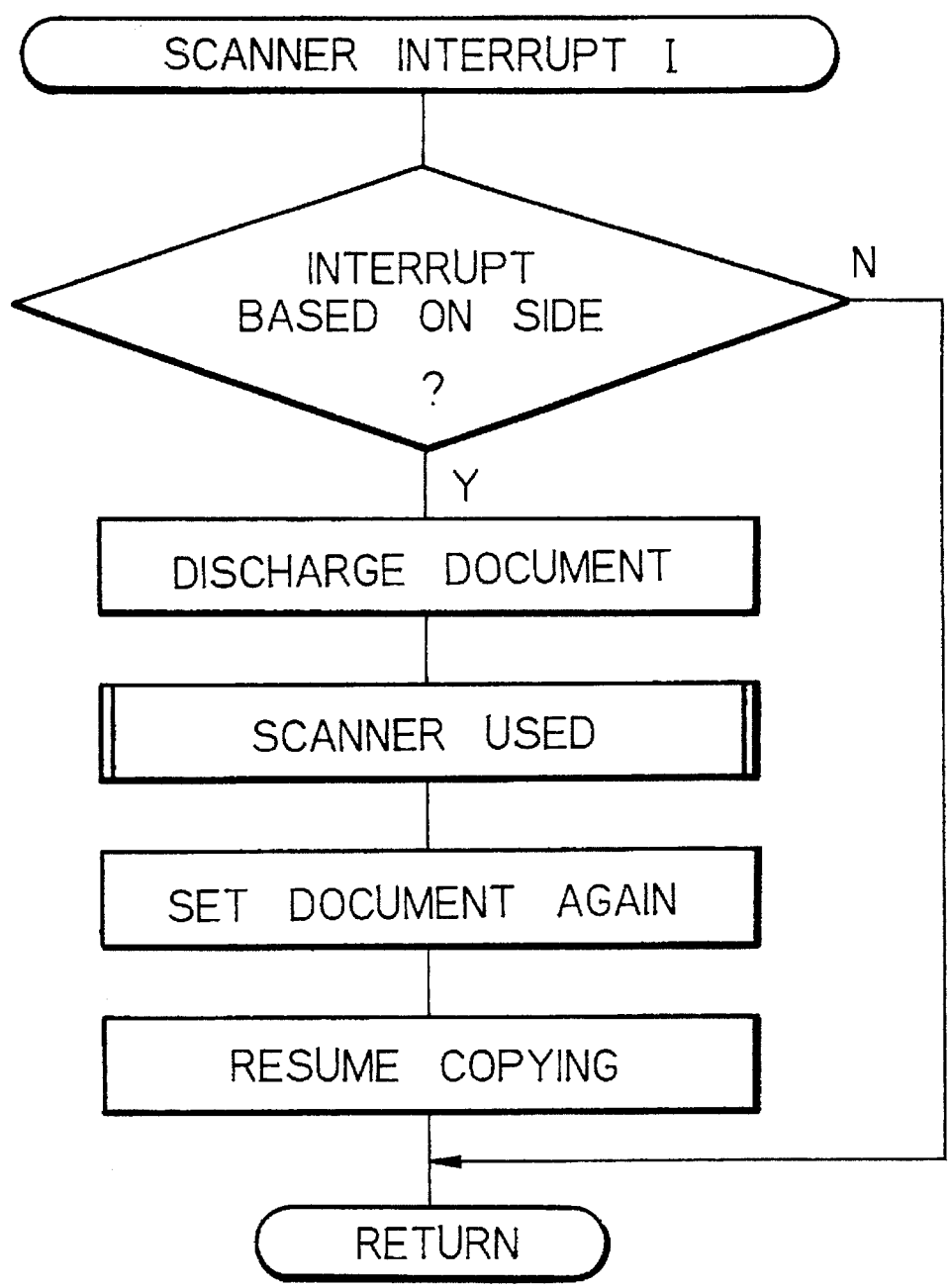
FIG. 2 is a flowchart showing a subroutine included in the procedure of FIG. 1.

The scanner interrupt I subroutine shown in FIG. 1 is implemented by second interrupting means. This subroutine occurs for each side of a two-sided document and is shown in FIG. 2 in detail. On the other hand, the scanner interrupt II subroutine is implemented by first interrupting means and shown in FIG. 3 in detail. Specifically, assume that the first side of a two-sided document has been fully processed when the scanner interrupt I routine occurs. Then, as shown in FIG. 2, the document being used by the ADF 2 is read and fed out, so that the scanner 1A and printer 1B are released. In this condition, an interrupt document is scanned by the scanner 1A while the first surface of the two-sided document is continuously printed by the printer 1B. After the interrupt processing, the two-sided document is again set and has the first side (front) thereof reproduced. Regarding the scanner interrupt II routine, which occurs on a document basis, the scanner 1A is immediately released while the printer 1B is continuously operated. Even if the scanner interrupt II occurs on a side basis, the same control procedure will be executed if the operation is interrupted at the end of a document.

In any case, since the printer 1B is continuously operated when the scanner 1A should be released for an interrupt document, the total time loss of the apparatus is reduced.

Figure 3:
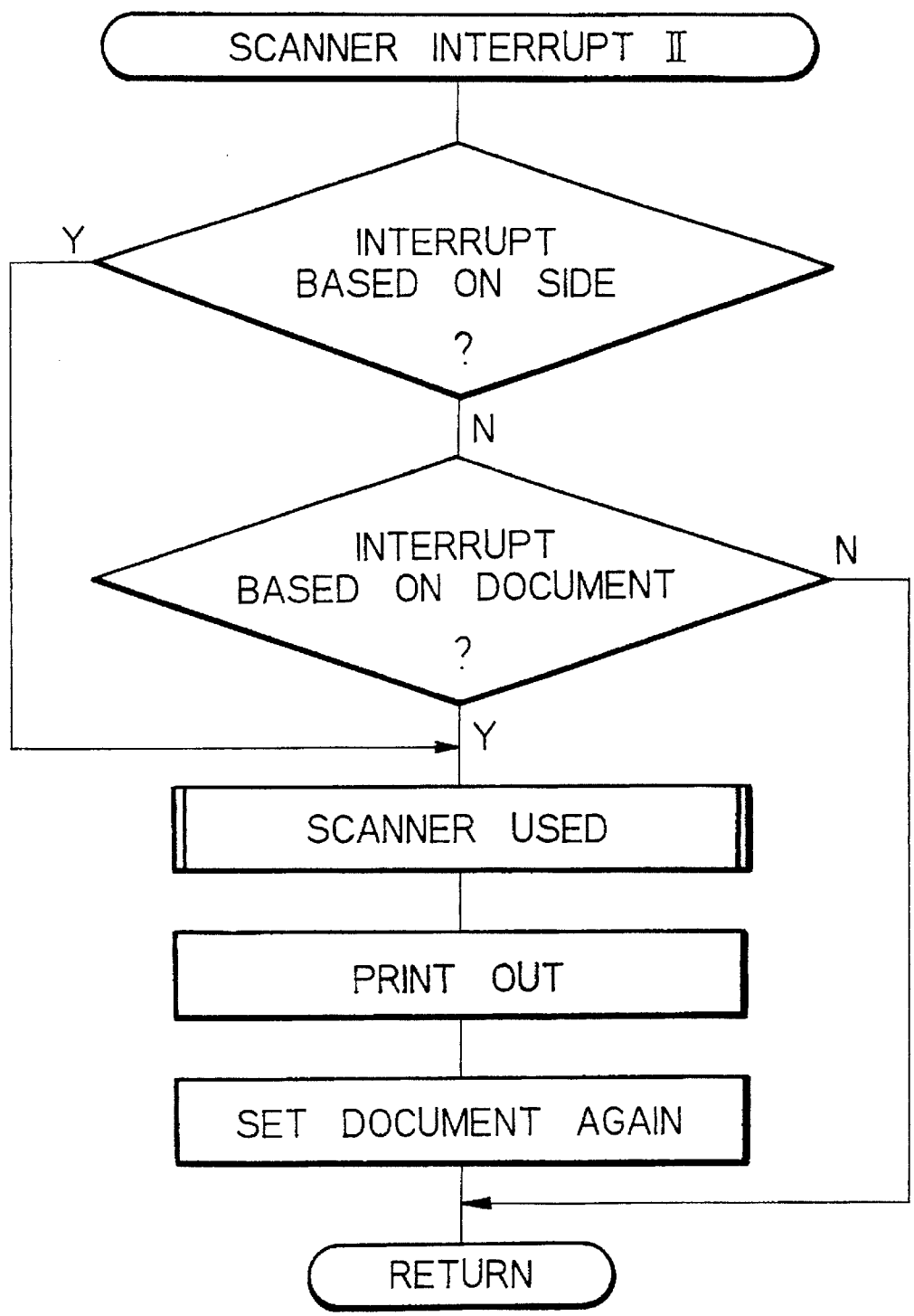
FIG. 3 is a flowchart showing another subroutine included in the procedure of FIG. 1.
Figure 4:
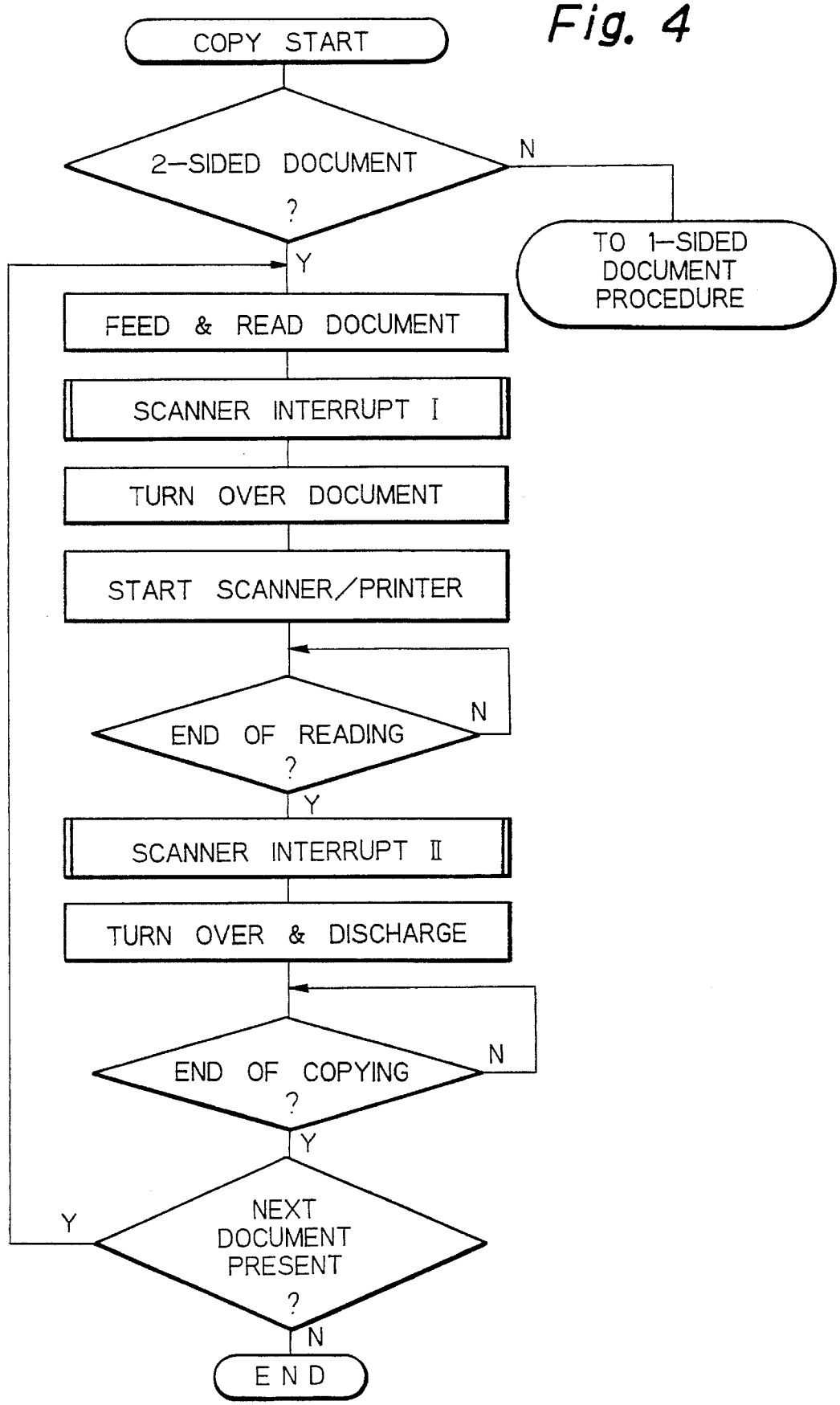
FIG. 4 is a flowchart representative of an alternative embodiment of the present invention.

FIG. 4 shows a specific routine to be executed when an ADF having a sheet turning function and a sheet through function is operated in the two-sided document copy mode. This routine is essentially similar to the routine of FIG. 1 except that as soon as a two-sided document is fed in, it is immediately read and stored, i.e., the scanner starting step is absent. The scanner interrupt I and II subroutines shown in FIGS. 2 and 3 are also applicable to this procedure. Particularly, when the embodiment is applied to an ADF with a sheet through capability, wasteful time consumption due to the replacement of documents is obviated. This, in turn, allows the document transport speed to be lowered and, therefore, reduces static electricity attributable to friction while protecting documents from damage.

In summary, it will be seen that the present invention provides a control method which, in a two-sided document copy mode, reads the second side of the document and stores the resulting image data in storing means, which can accommodate two pages, reads and stores the first side of the document while printing out the image data stored in the storing means, and then prints out data representative of the first side and stored in the storing means. Hence, the document can be replaced before the preceding side is fully copied. This eliminates the extra period of time otherwise consumed by the replacement of documents. As a result, the occupancy time of a digital copier, controlled by the method of the invention, is reduced as a whole, promoting the efficient operation of the copier. Moreover, even when a two-sided document copy mode using an ADF should be interrupted, image data representative of the second and first sides of a two-sided document can be continuously printed out since they are stored in the storing means. This also reduces the overall time loss of the digital copier.

Various modifications will become possible for those skilled in the art after receiving the teachings of the present disclosure without departing from the scope thereof.

What is claimed is:

1. A method of controlling a digital copier operable in a two-sided document copy mode and having a scanner for reading a document image, a printer for printing out image data generated by said scanner on a sheet, an automatic document feeder (ADF) for transporting a document to be read by said scanner and having a document turning function, storing means capable of storing image data representative of at least two documents, and control means, said method comprising the steps of:

(a) causing, when the two-sided document copy mode is selected, said ADF to turn over a two-sided document to a second side, and causing said scanner to read said second side of said two-sided document before copying a first side of said two-sided document;

(b) storing image data representative of said second side in said storing means;

(c) causing said ADF to turn over said two-sided document to said first side;

(d) causing said scanner to read said first side of said two-sided document turned over;

(e) storing, image data representative of said first side in said storing means and, at the same time, sequentially reading said image data representative of said first and second sides out of said storing means; and (f) causing said printer to print out said image data representative of said first and second sides.

2. A method as claimed in claim 1, further comprising (g) providing:

first interrupting means for interrupting, when a plurality of documents are read, a reading operation on a document basis;

second interrupting means for interrupting said reading operation on a side basis; and selecting means for allowing either said first interrupting means or said second interrupting means to be selected, as desired;

wherein when said first interrupting means is selected or when said second interrupting means is selected and an interruption occurs at an end of said two-sided document, said scanner is rendered usable while a printing operation of said printer using said storing means is continued, and wherein when said second interrupting means is selected and an interruption occurs at an end of one side of said two-sided document, said scanner and said printer are rendered usable after said scanner has fully read the document image.

3. A method of controlling a digital copier operable in a two-sided document copy mode and having a scanner for reading a document image, a printer for printing out image data generated by said scanner on a sheet, an ADF for transporting a document to be read by said scanner and having a document turning function and a sheet through function, storing means capable of storing image data representative of at least two documents, and control means, said method comprising the steps of:

(a) causing, when the two-sided document copy mode is selected, said scanner to read a second side of a two-sided document while said ADF is turning over and feeding said two-sided document;

(b) storing image data representative of said second side in said storing means;

(c) causing said ADF to turn over said two-sided document to a first side, and causing said scanner to read said first side of said two-sided document turned over;

(d) storing image data representative of said first side in said storing means and, at the same time, sequentially reading said image data representative of said first and second sides out of said storing means; and (e) causing said printer to print out said image data representative of said first and second sides.

4. A method as claimed in claim 3, further comprising (f) providing:

first interrupting means for interrupting, when a plurality of documents are read, a reading operation on a document basis;

second interrupting means for interrupting said reading operation on a side basis; and selecting means for allowing either said first interrupting means or said second interrupting means to be selected, as desired;

wherein when said first interrupting means is selected or when said second interrupting means is selected and an interruption occurs at an end of said two-sided document, said scanner is rendered usable while a printing operation of said printer using said storing means is continued, and wherein when said second interrupting means is selected and an interruption occurs at an end of one side of said two-sided document, said scanner and said printer are rendered usable after said scanner has fully read the document image.

5. A digital copier operable in a two-sided document copy mode, comprising:

a scanner for reading a document image;

a printer for printing out image data generated by said scanner on a sheet;

an ADF for transporting a document to be read by said scanner and having a document turning function;

storing means capable of storing image data representative of at least two documents; and control means for controlling said scanner, said printer, said ADF and said storing means such that when the two-sided document copy mode is selected, said ADF turns over the two-sided document to a second side, said two-sided scanner reads said second side of said two-sided document before copying a first side, image data representative of said second side are written to said storing means, said ADF turns over the two-sided document to said first side, said scanner reads said first side after said ADF has turned over said two-sided document, and then image data representative of said first side are written to said storing means and, at the same time, said image data representative of said first and second sides are sequentially read out and printed out by said printer.

6. A digital copier as claimed in claim 5, further comprising:

first interrupting means for interrupting, when a plurality of documents are read, a reading operation on a document basis;

second interrupting means for interrupting said reading operation on a side basis; and selecting means for allowing either said first interrupting means or said second interrupting means to be selected, as desired.

7. A digital copier as claimed in claim 6, wherein said control means controls said first interrupting means, said second interrupting means and said selecting means such that when said first interrupting means is selected or when said second interrupting means is selected and an interruption occurs at an end of said two-sided document, said scanner is rendered usable while a printing operation of said printer using said storing means is continued, and wherein when said second interrupting means is selected and an interruption occurs at an end of one side of said two-sided document, said scanner and said printer are rendered usable after said scanner has fully read the document image.

8. A digital copier operable in a two-sided document copy mode, comprising:

a scanner for reading a document image;

a printer for printing out image data generated by said scanner on a sheet;

an ADF for transporting a document to be read by said scanner and having a document turning function and a sheet through function which allows the document to be read as the document is being transported;

storing means capable of storing image data representative of at least two documents; and control means for controlling said scanner, said printer, said ADF and said storing means such that when the two-sided document copy mode is selected, said scanner reads a second side of said two-sided document while said ADF is turning over and feeding said two-sided document, image data representative of said second side are written to said storing means, said ADF turns over the two-sided document to a first side, said scanner reads said first side of said two-sided document turned over, and image data representative of said first side are written to said storing means and, at the same time, said image data representative of said first and second sides are sequentially read out of said storing means and printed out by said printer.

9. A digital copier as claimed in claim 8, further comprising:

first interrupting means for interrupting, when a plurality of documents are read, a reading operation on a document basis;

second interrupting means for interrupting said reading operation on a side basis; and selecting means for allowing either said first interrupting means or said second interrupting means to be selected, as desired.

10. A digital copier as claimed in claim 9, wherein said control means controls said first interrupting means, said second interrupting means and said selecting means such that when said first interrupting means is selected or when said second interrupting means is selected and an interruption occurs at an end of said two-sided document, said scanner is rendered usable while a printing operation of said printer using said storing means is continued, and wherein when said second interrupting means is selected and an interruption occurs at an end of one side of said two-sided document, said scanner and said printer are rendered usable after said scanner has fully read the document image.

* * * * *